(12) United States Patent (10) Patent No.: US 9,635,359 B2
Kobayashi (45) Date of Patent: Apr. 25, 2017

(54) METHOD AND APPARATUS FOR DETERMINING DEBLOCKING FILTER INTENSITY

(71) Applicant: CANON KABUSHIKI KAISHA, Tokyo (JP)

(72) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 14/343,505

(22) PCT Filed: Nov. 22, 2012

(86) PCT No.: PCT/JP2012/081016
§ 371 (c)(1),
(2) Date: Mar. 7, 2014

(87) PCT Pub. No.: WO2013/081085
PCT Pub. Date: Jun. 6, 2013

(65) Prior Publication Data
US 2014/0219348 A1 Aug. 7, 2014

(30) Foreign Application Priority Data

Nov. 28, 2011 (JP) .................. 2011-259512
Jul. 6, 2012 (JP) .................. 2012-153021

(51) Int. Cl.
*H04N 19/00* (2014.01)
*H04N 19/117* (2014.01)
(Continued)

(52) U.S. Cl.
CPC ..... *H04N 19/00793* (2013.01); *H04N 19/117* (2014.11); *H04N 19/14* (2014.11);
(Continued)

(58) Field of Classification Search
CPC .... H04N 19/117; H04N 19/157; H04N 19/82; H04N 19/154; H04N 19/176; H04N 19/86; H04N 19/14; H04N 19/61; H04N 19/63
See application file for complete search history.

(56) References Cited

U.S. PATENT DOCUMENTS 6,064,776 A * 5/2000 Kikuchi ................. H04N 19/80
375/240.29
6,496,605 B1 * 12/2002 Osa .......................... G06T 5/20
348/420.1
(Continued)

FOREIGN PATENT DOCUMENTS

JP 2002-238049 A 8/2002
JP 2003-304538 A 10/2003
(Continued)

*Primary Examiner* — Jay Patel
*Assistant Examiner* — Marnie Matt
(74) *Attorney, Agent, or Firm* — Cowan, Liebowitz & Latman, P.C.

(57) ABSTRACT

A filter intensity calculated in accordance with the image quality deterioration degree between an original image and locally decoded image is corrected in accordance with pattern information of the locally decoded image, and deblocking filter processing is performed by using the corrected filter intensity. The deblocking filter processing is performed by using a filter intensity which is calculated in accordance with the image quality deterioration degree between the original image and locally decoded image and the flatness of the original image or locally decoded image, and which increases as the image quality deterioration degree and flatness of an image increase.

16 Claims, 14 Drawing Sheets

(51) Int. Cl.
*H04N 19/14* (2014.01)
*H04N 19/154* (2014.01)
*H04N 19/157* (2014.01)
*H04N 19/176* (2014.01)
*H04N 19/61* (2014.01)
*H04N 19/63* (2014.01)
*H04N 19/82* (2014.01)
*H04N 19/86* (2014.01)

(52) U.S. Cl.
CPC ......... *H04N 19/154* (2014.11); *H04N 19/157* (2014.11); *H04N 19/176* (2014.11); *H04N 19/61* (2014.11); *H04N 19/63* (2014.11); *H04N 19/82* (2014.11); *H04N 19/86* (2014.11)

(56) References Cited

U.S. PATENT DOCUMENTS

| | | | | |
|---|---|---|---|---|
| 7,706,622 B2 * | 4/2010 | Kobayashi | ........... | H04N 19/176 375/240.24 |
| 2002/0118399 A1 | 8/2002 | Estevez | ................ | H04N 19/176 358/426.07 |
| 2002/0141503 A1 * | 10/2002 | Kobayashi | ........... | H04N 9/8042 375/240.27 |
| 2004/0022315 A1 * | 2/2004 | Park | .................... | H04N 19/176 375/240.2 |
| 2004/0071363 A1 * | 4/2004 | Kouri | ................. | G06K 9/00516 382/276 |
| 2006/0115168 A1 * | 6/2006 | Kobayashi | ........... | H04N 19/176 382/239 |
| 2008/0260025 A1 * | 10/2008 | Wada | ................... | H04N 19/176 375/240.03 |
| 2009/0060044 A1 * | 3/2009 | Suh | ........................ | H04H 60/13 375/240.16 |
| 2010/0014765 A1 * | 1/2010 | Kotaka | ................ | H04N 19/176 382/236 |
| 2010/0177822 A1 * | 7/2010 | Karczewicz | ........... | H04N 19/46 375/240.12 |
| 2011/0002395 A1 * | 1/2011 | Nishihara | ............ | H04N 19/117 375/240.24 |
| 2011/0026611 A1 * | 2/2011 | Kenji | ................... | H04N 19/172 375/240.29 |
| 2011/0110431 A1 * | 5/2011 | Laroche | ............... | H04N 19/139 375/240.16 |
| 2012/0121188 A1 * | 5/2012 | Kenji | ..................... | H04N 19/46 382/196 |
| 2013/0188706 A1 * | 7/2013 | Minezawa | ........... | H04N 19/147 375/240.12 |

FOREIGN PATENT DOCUMENTS

| | | |
|---|---|---|
| JP | 2007-166522 A | 6/2007 |
| JP | 2008-011324 A | 1/2008 |
| JP | 2008-205534 A | 9/2008 |
| JP | 2009-164915 A | 7/2009 |
| JP | 4799678 B | 8/2011 |
| WO | WO 2012071417 A1 * | 5/2012 ............. H04N 19/51 |

* cited by examiner

F I G. 2
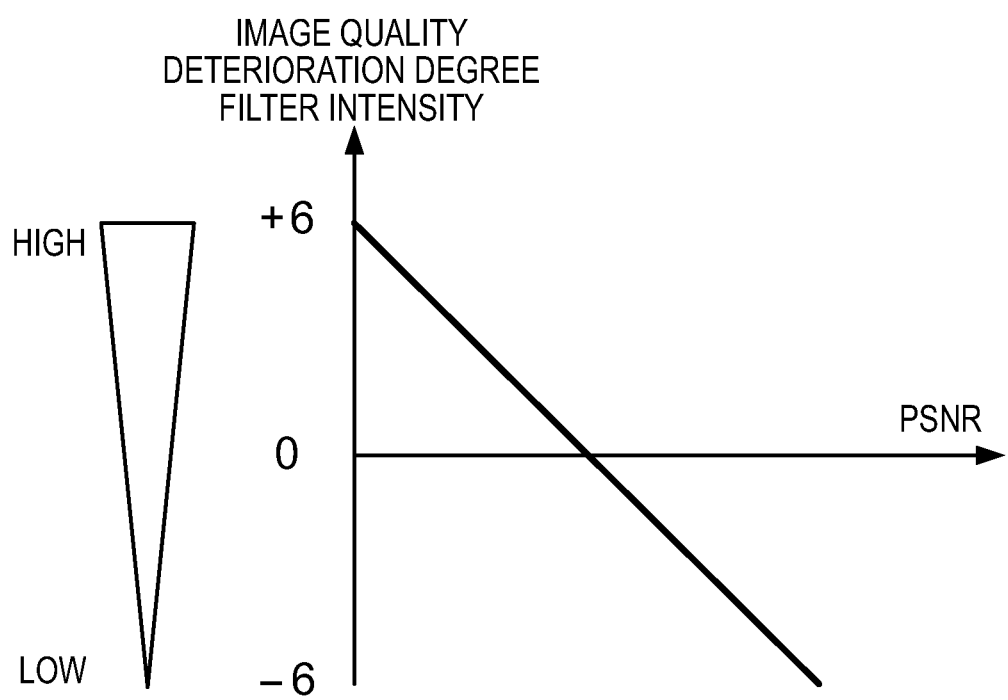

FIG. 5

| EVALUATION ITEMS | | VALUE | EVALUATION | SCORE |
|---|---|---|---|---|
| ENCODING INFORMATION | CODE AMOUNT AVERAGE VALUE | 3000 | SLIGHTLY LARGE | −1 |
| | QUANTIZATION STEP AVERAGE VALUE | 48 | VERY COARSE | +5 |
| | INTRA PREDICTION MODE RATIO | 10% | LOW | −2 |
| | MOTION VECTOR RANDOMNESS | 10 | LOW | −5 |
| | RATIO OF LARGE ORTHOGONAL TRANSFORMATION SIZE | 80% | HIGH | +2 |
| PATTERN INFORMATION | BOUNDARY DIFFERENCE VALUE | 77 | VERY LARGE | +6 |
| TOTAL SCORE (ESTIMATED FILTER INTENSITY) | | | | +5 |

F I G. 6

| No. | BLOCK NOISE CONSPICUITY | FILTER INTENSITY DETERMINATION | FILTER INTENSITY CORRECTION |
|---|---|---|---|
| 1 | CONSPICUOUS | LOW | INCREASE |
| 2 | CONSPICUOUS | HIGH | DECREASE |
| 3 | INCONSPICUOUS | LOW | NO CORRECTION |
| 4 | INCONSPICUOUS | HIGH | DECREASE |

FIG. 9A — PATTERN FLATNESS (901, 902)

| 1 | 5 | 9 | 9 | 8 | 5 | 4 | 3 |
|---|---|---|---|---|---|---|---|
| 5 | 7 | 9 | 9 | 9 | 8 | 6 | 2 |
| 9 | 9 | 9 | 9 | 9 | 9 | 7 | 5 |
| 9 | 9 | 9 | 0 | 9 | 9 | 8 | 9 |
| 6 | 6 | 9 | 9 | 9 | 9 | 9 | 9 |
| 7 | 7 | 9 | 8 | 9 | 8 | 7 | 9 |

FIG. 9B — IMAGE QUALITY DETERIORATION DEGREE (903, 904)

| 1 | 5 | 8 | 7 | 8 | 3 | 0 | 1 |
|---|---|---|---|---|---|---|---|
| 5 | 8 | 8 | 8 | 9 | 8 | 4 | 0 |
| 8 | 8 | 8 | 8 | 9 | 7 | 5 | 5 |
| 6 | 8 | 8 | 0 | 8 | 7 | 6 | 7 |
| 6 | 6 | 7 | 8 | 8 | 7 | 6 | 7 |
| 6 | 6 | 8 | 8 | 8 | 6 | 5 | 7 |

FIG. 13A

| +3 | +3 | +3 | +3 | +3 | +3 | +3 |
|----|----|----|----|----|----|----|
| +3 | +3 | +3 | +3 | +3 | +3 | +3 |
| +3 | +3 | +3 | +3 | +3 | +3 | +3 |
| +3 | +3 | +3 | +3 | +3 | +3 | +3 |
| +3 | +3 | +3 | +3 | +3 | +3 | +3 |
| +3 | +3 | +3 | +3 | +3 | +3 | +3 |
| +3 | +3 | +3 | +3 | +3 | +3 | +3 |
| +3 | +3 | +3 | +3 | +3 | +3 | +3 |

FILTER INTENSITY PROCESSED BY WEIGHTED ADDITION (WHOLE)

FIG. 13B

| SLICE | | SLICE | | | SLICE | | |
|---|---|---|---|---|---|---|---|
| +2 | +2 | +2 | +4 | +4 | +4 | +4 | +4 |
| +2 | +2 | +2 | +4 | +4 | +4 | +4 | +4 |
| +2 | +2 | +2 | +4 | +4 | +4 | +4 | +4 |
| +2 | +2 | +2 | +4 | +4 | +4 | +4 | +4 |
| +2 | +2 | +2 | +4 | +4 | +4 | +4 | +4 |
| +2 | +2 | +2 | +4 | +4 | +4 | +4 | +4 |
| +2 | +2 | +2 | +4 | +4 | +4 | +4 | +4 |
| +2 | +2 | +2 | +4 | +4 | +4 | +4 | +4 |

FILTER INTENSITY PROCESSED BY WEIGHTED ADDITION (EACH PREDETERMINED REGION)

FIG. 13C

| -3 | -1 | +1 | +2 | +4 | +4 | +2 | +3 |
|----|----|----|----|----|----|----|----|
| -1 | 0 | +2 | +3 | +4 | +4 | +3 | +2 |
| +1 | +2 | +3 | +5 | +5 | +4 | +4 | +4 |
| +3 | +4 | +5 | +4 | +4 | +4 | +4 | +4 |
| +4 | +4 | +5 | +4 | +4 | +4 | +4 | +4 |
| +4 | +4 | +4 | +4 | +4 | +4 | +5 | +3 |
| +4 | +5 | +4 | +4 | +4 | +5 | +4 | +2 |
| +4 | +4 | +5 | +5 | +4 | +3 | +2 | +3 |

FILTER INTENSITY PROCESSED BY SPATIAL SMOOTHING

F I G. 14
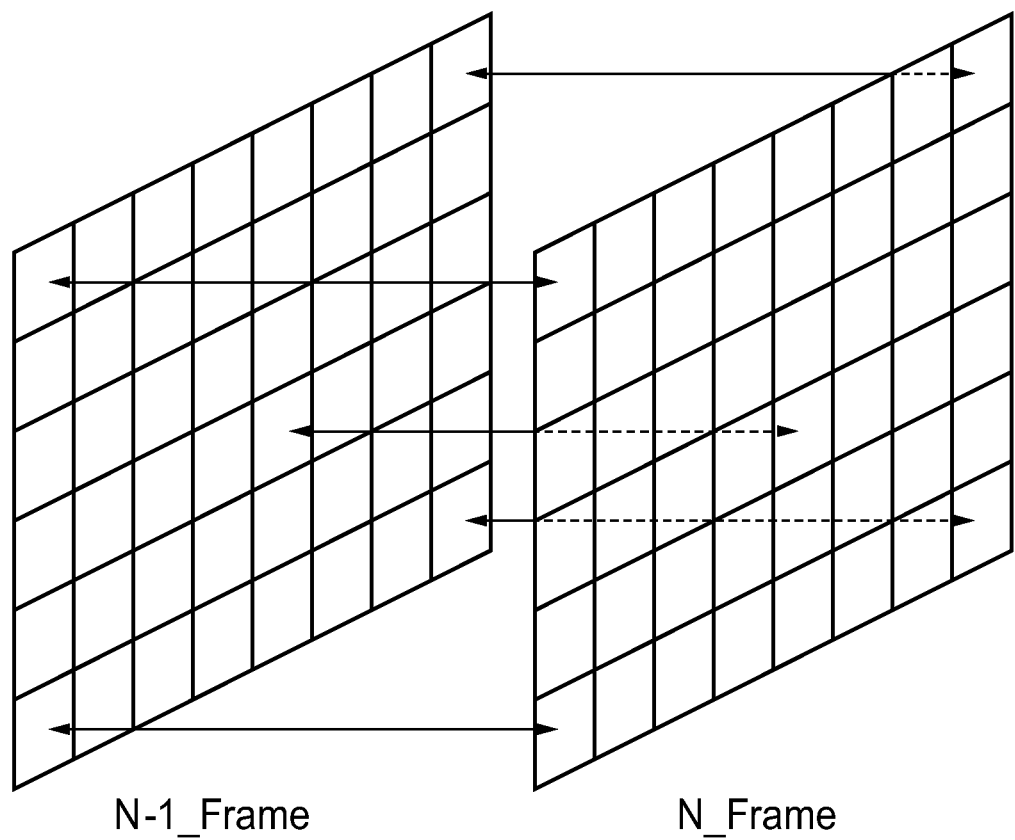

METHOD AND APPARATUS FOR DETERMINING DEBLOCKING FILTER INTENSITY

CROSS-REFERENCE TO RELATED APPLICATIONS

This application is a national stage application of International Application No. PCT/JP2012/081016, filed Nov. 22, 2012, whose benefit is claimed and which claims the benefit of Japanese Patent Applications Nos. 2011-259512, filed Nov. 28, 2011 and 2012-153021, filed Jul. 6, 2012, the entire disclosures of which are incorporated herein by reference.

TECHNICAL FIELD

The present invention relates to a moving image encoding apparatus, a control method thereof, and a computer program.

BACKGROUND ART

As a technique for efficiently encoding an image, a JPEG compression technique and encoding methods such as MPEG1 and MPEG2 using the motion prediction-motion compensation technique have been established. Manufacturers are developing and manufacturing image capturing apparatuses such as digital cameras and digital video cameras and DVD recorders capable of recording images on recording media by using these encoding methods.

A digital moving image has an enormous data amount. To compress this enormous data amount, the compression ratio must be increased by performing coarse quantization when encoding each block. However, a quantization error occurring when the coarse quantization is performed produces a pixel value level difference in the block boundary. When the user watches the image, the image quality deteriorates because he or she perceives this pixel value level difference (to be referred to as block noise hereinafter). In H.264 as an encoding method, a noise reduction filter called a deblocking filter has been standardized in order to reduce this block noise. H.264 has been standardized by the ITU-T (International Telecommunication Union Telecommunication Standardization Sector) and the ISO (International Organization for Standardization), and is formally called H.264/MPEG-4 part 10.

This deblocking filter processing is performed on a decoded image. When performing local decoding during encoding in order to perform motion compensation, the deblocking filter processing can be performed on this locally decoded image. The filter intensity of this deblocking filter changes pixel by pixel based on a quantization parameter or the like, in conformity with the method standardized by H.264. A mechanism that changes the filter intensity for each region (slice) larger than a pixel has also been standardized. In conformity with this mechanism, the filter intensity of the deblocking filter can be controlled during encoding. The locally decoded image having undergone the deblocking filter processing is an image to be referred to when performing motion compensation on the next frame in the encoding order. Therefore, the encoding efficiency can be increased by reducing the block noise.

A technique as described in Japanese Patent Laid-Open No. 2008-11324 has been disclosed as a technique of controlling the filter intensity in the filter processing during encoding. Patent literature 1 has disclosed a technique of changing the intensity of a bandlimiting filter with respect to an original image, in accordance with the PSNR of an unencoded original image and a predicted image generated by motion compensation during encoding.

SUMMARY OF INVENTION

As described above, the method of controlling the deblocking filter processing and its filter intensity has been standardized by the H.264 standards. However, if the deblocking filter processing is not performed with a filter intensity corresponding to the degree of block noise, a pattern of the image is blurred, or, on the contrary, the block noise cannot sufficiently be reduced.

Also, if block noise has not sufficiently been reduced when performing motion compensation by referring to an image having undergone the deblocking filter processing, block noise not existing in an unencoded original image exists in a predicted image after the motion compensation, and this decreases the encoding efficiency.

Accordingly, the present invention provides a technique of performing deblocking filter processing with a filter intensity matching the degree of generated block noise, thereby sufficiently reducing the block noise.

One aspect of embodiments of the invention relates to a moving image encoding apparatus for performing encoding using inter prediction between frames, comprising: predicted image generating means for generating a predicted image for the inter prediction; transforming means for dividing an original image into blocks each having a predetermined number of pixels, and for performing orthogonal transformation and quantization on a difference between an encoding target image and the predicted image for each of the blocks; encoding means for generating an encoded stream by encoding a transformation result from the transforming means; locally decoding means for generating a locally decoded image by performing inverse quantization and inverse orthogonal transformation on the transformation result from the transforming means; filter processing means for performing deblocking filter processing on the locally decoded image, and providing the locally decoded image having undergone the deblocking filter processing to the predicted image generating means; image quality deterioration degree calculating means for calculating an image quality deterioration degree from the original image and the locally decoded image; and filter intensity determining means for determining a filter intensity to be used in the deblocking filter processing, based on the calculated image quality deterioration degree, and a difference value between adjacent boundary pixels of the locally decoded image and another locally decoded image adjacent to the locally decoded image.

Another aspect of embodiments of the invention relates to a moving image encoding apparatus for performing encoding using inter prediction between frames, comprising: predicted image generating means for generating a predicted image for the inter prediction; transforming means for dividing an original image into blocks each having a predetermined number of pixels, and for performing orthogonal transformation and quantization on a difference between an encoding target image and the predicted image for each of the blocks; encoding means for generating an encoded stream by encoding a transformation result from the transforming means; locally decoding means for generating a locally decoded image by performing inverse quantization and inverse orthogonal transformation on the transformation result from the transforming means; image quality deterioration degree calculating means for calculating an image quality deterioration degree from the original image and the locally decoded image for each block; flatness calculating means for calculating a flatness of the original image or the locally decoded image for each block; filter intensity determining means for determining a filter intensity corresponding to the image quality deterioration degree and the flatness for each block; and filter processing means for performing deblocking filter processing on the locally decoded image by using the filter intensity, and providing the locally decoded image having undergone the deblocking filter processing to the predicted image generating means, wherein the filter intensity determining means comprises filter intensity calculating means for calculating, based on the image quality deterioration degree and the flatness, a filter intensity which increases as the image quality deterioration degree and the flatness of an image increase.

Further features of the present invention will become apparent from the following description of exemplary embodiments (with reference to the attached drawings).

BRIEF DESCRIPTION OF DRAWINGS

FIG. 2 is a view for explaining an image quality deterioration degree filter intensity calculation method in the first embodiment;

FIG. 5 is a view for explaining an image quality deterioration degree filter intensity determination method in the first embodiment;

FIG. 6 is a view for explaining an image quality deterioration degree filter intensity correction method in the first embodiment;

FIGS. 9A and 9B are views for explaining the flatness and image quality deterioration degree in the second embodiment;

FIGS. 13A to 13C are views showing examples of the filter intensity as results of a weighted addition processing and spatial smoothing processing in the second embodiment;

FIG. 14 is a view for explaining a filter intensity temporal smoothing processing in the second embodiment.

DESCRIPTION OF EMBODIMENTS

Embodiments of the present invention will be explained below with reference to the accompanying drawings.

First Embodiment

Figure 1:
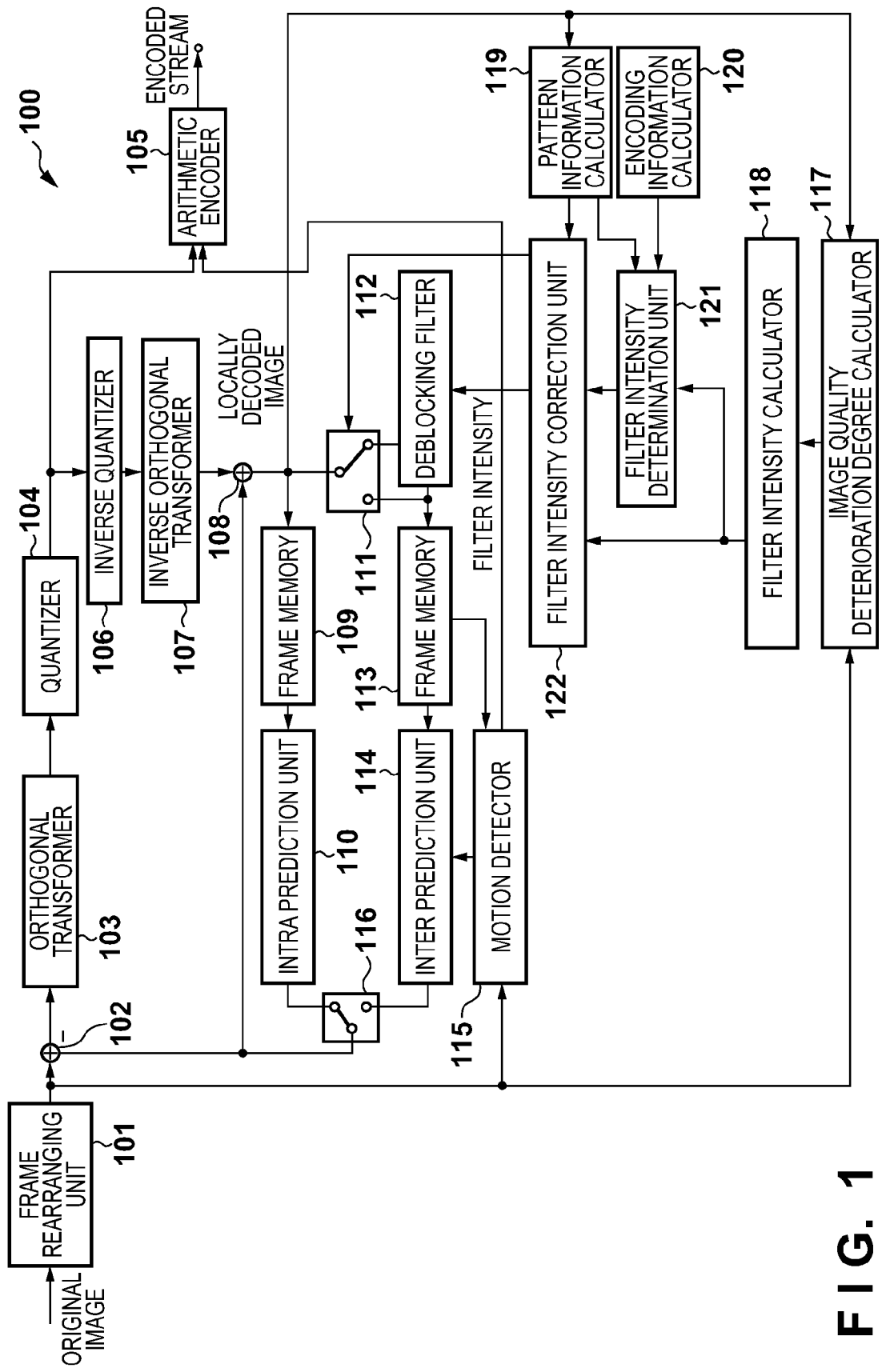
FIG. 1 is a view showing an example of the arrangement of a moving image encoding apparatus according to the first embodiment.

FIG. 1 is a block diagram showing an example of the arrangement of a moving image encoding apparatus according to an embodiment of the present invention. In a moving image encoding apparatus 100 according to this embodiment, a filter intensity calculated in accordance with the image quality deterioration degree of a locally decoded image with respect to an original image is corrected in accordance with encoding information and pattern information of the locally decoded image. The moving image encoding apparatus performs deblocking filter processing based on the corrected filter intensity. The example of the arrangement of the present invention will be explained below with reference to FIG. 1.

The moving image encoding apparatus 100 according to this embodiment includes a frame rearranging unit 101, subtracter 102, orthogonal transformer 103, quantizer 104, arithmetic encoder 105, inverse quantizer 106, inverse orthogonal transformer 107, adder 108, frame memories 109 and 113, intra prediction unit 110, switches 111 and 116, deblocking filter 112, inter prediction unit 114, motion detector 115, image quality deterioration degree calculator 117, filter intensity calculator 118, pattern information calculator 119, encoding information calculator 120, filter intensity determination unit 121, and filter intensity correction unit 122. The moving image encoding apparatus according to this embodiment divides an input original image into blocks each having a predetermined number of pixels, performs a predictive encoding processing on each block, and outputs an encoded stream.

In the moving image encoding apparatus shown in FIG. 1, each block can be formed by hardware by using a dedicated logic circuit or memory. Alternatively, each block can be formed by software by executing a processing program stored in a memory by using a computer such as a CPU.

The predictive encoding processing corresponding to this embodiment will be explained below. First, the frame rearranging unit 101 rearranges, in the encoding order, original images input in the display order. The subtracter 102 subtract predicted image data provided via the switch 116 from input image data, and outputs image residue data to the orthogonal transformer 103. Note that the generation of the predicted image data will be described later.

The orthogonal transformer 103 orthogonally transforms the image residue data output from the subtracter 102, and outputs the transformation coefficient. The quantizer 104 quantizes the transformation coefficient output from the orthogonal transformer 103 by using a predetermined quantization parameter. The orthogonal transformer 103 and quantizer 104 will collectively be referred to as a transformer hereinafter. The arithmetic encoder 105 arithmetically encodes the quantized transformation coefficient as a transformation result obtained by the transformer through orthogonal transformation and quantization, and outputs an encoded stream. The transformation coefficient quantized by the quantizer 104 is also used in the generation of the predicted image data described above.

The inverse quantizer 106 inversely quantizes the transformation coefficient quantized by the quantizer 104. The inverse orthogonal transformer 107 inversely orthogonally transforms the transformation coefficient obtained by the inverse quantization in the inverse quantizer 106, and outputs decoded image residue data. The adder 108 adds the decoded image residue data output from the inverse orthogonal transformer 107 and the predicted image data, and outputs locally decoded image data. This locally decoded image data is output to the frame memory 109, switch 111, pattern information calculator 119, and image quality deterioration degree calculator 117. The inverse quantizer 106, inverse orthogonal transformer 107, and adder 108 will collectively be referred to as a local decoder hereinafter.

The frame memory 109 stores the locally decoded image data output from the adder 108. The switch 111 switches whether to perform deblocking filter processing on the locally decoded image data output from the adder 108. When performing the deblocking filter processing on the locally decoded image data, the deblocking filter 112 performs the deblocking filter processing based on a filter intensity calculated by a method to be described later. The frame memory 113 records the locally decoded image data having undergone the deblocking filter processing. When performing no deblocking filter processing, the data is directly recorded in the frame memory 113 by bypassing the deblocking filter 112. Of the locally decoded image data, data that may be referred to in later prediction is saved in the frame memory 109 or 113.

The intra prediction unit 110 performs an intra-frame prediction processing by using the locally decoded image data recorded in the frame memory 109, thereby generating a predicted image. The inter prediction unit 114 performs an inter-frame prediction processing based on motion vector information detected by the motion detector 115 by using the locally decoded image data having undergone the deblocking filter processing and recorded in the frame memory 113, thereby generating a predicted image. The motion detector 115 detects a motion vector in the input image data by referring to the locally decoded image recorded in the frame memory 113. The motion detector 115 outputs the detected motion vector information to the arithmetic encoder 105 and inter prediction unit 114.

Note that if block noise remains in the locally decoded image having undergone the deblocking filter processing and recorded in the frame memory 113, the amount of output data from the subtracter 102 increases because information not existing in the original image exists in the predicted image data. That is, sufficiently reducing block noise by the deblocking filter 112 makes it possible to reduce the output data amount from the subtracter 102, and increase the encoding efficiency.

The switch 116 is a selector for selecting whether to use, as predicted image data, the predicted image data generated by the intra prediction unit 110 or the predicted image data generated by the inter prediction unit 114, that is, whether to use intra prediction or inter prediction. For example, the output from the intra prediction unit 110 is selected for an I picture, and one of the outputs from the intra prediction unit 110 and inter prediction unit 114, which has higher prediction accuracy is selected for a P picture. The selected predicted image data is output to the subtracter 102 and adder 108.

The image quality deterioration degree calculator 117 calculates the image quality deterioration degree between an original image and a locally decoded image obtained by encoding the original image and locally decoding the encoded image. An example of the image quality deterioration degree is the difference between the original image and locally decoded image or the PSNR (Peak Signal-to-Noise Ratio) between them. Note that the original image and locally decoded image for calculating the image quality deterioration degree have phases matched in the moving image encoding apparatus, and they are images of the same frame.

The filter intensity calculator 118 calculates the image quality deterioration degree filter intensity in accordance with the image quality deterioration degree calculated by the image quality deterioration degree calculator 117. The pattern information calculator 119 calculates pattern information of the locally decoded image before the deblocking filter processing is performed on it. The encoding information calculator 120 collects encoding parameters of encoding and outputs the parameters as encoding information.

The filter intensity determination unit 121 determines whether the image quality deterioration degree filter intensity is appropriate for the locally decoded image, in accordance with the pattern information and encoding information. The filter intensity correction unit 122 corrects the image quality deterioration degree filter intensity in accordance with the determination result from the filter intensity determination unit 121 and the pattern information, and outputs the corrected filter intensity to the deblocking filter 112.

The foregoing is an explanation of the moving image encoding apparatus according to this embodiment. Note that an arrangement that calculates the filter intensity by using the locally decoded image before the deblocking filter processing is performed on it will be explained in this embodiment, but the filter intensity may also be calculated by using the locally decoded image having undergone the deblocking filter processing. When calculating the filter intensity by using the locally decoded image having undergone the deblocking filter processing, the filter intensity is calculated in accordance with the image quality deterioration degree and pattern information of the image having undergone the filter processing.

Next, details of the image quality deterioration degree calculator 117, filter intensity calculator 118, pattern information calculator 119, encoding information calculator 120, filter intensity determination unit 121, and filter intensity correction unit 122 will be explained.

[Image Quality Deterioration Degree Calculator 117 & Filter Intensity Calculator 118]

First, the image quality deterioration degree calculator 117 and filter intensity calculator 118 will be explained in detail below with reference to FIG. 2. Note that in this embodiment, an example in which the image quality deterioration degree calculator 117 calculates the PSNR between an original image and locally decoded image as the image quality deterioration degree will be explained.

The filter intensity calculator 118 calculates the image quality deterioration degree filter intensity in accordance with the PSNR objectively representing information on the pixel value difference between an original image and locally decoded image. As this PSNR, the image quality deterioration degree calculator 117 calculates, for example, the PSNR between two images with respect to the whole frame. The meaning of the value of the PSNR is that the value of the PSNR decreases as the pixel value difference between an original image and locally decoded image increases, and increases as the pixel value difference between an original image and locally decoded image decreases. By calculating the PSNR like this, it is possible to calculate the difference between an original image and locally decoded image, that is, the image quality deterioration degree resulting from the predictive encoding processing.

This PSNR is calculated by using a locally decoded image and original image by $$PSNR = 10 \log_{10} \frac{N \times M \times T^2}{\sum_{i=0}^{N} \sum_{j=0}^{M} \{p(i,j) - p'(i,j)\}^2} \quad (1)$$

where N and M represent the numbers of vertical and horizontal pixels of the image, p(i,j) represents a pixel value at a position (i,j) in the present image data, p'(i,j) represents a pixel value at a position (i,j) in the locally decoded image, and T represents the number of gray levels of the image −1 (T=255 for an 8-bit/pixel image).

In accordance with the PSNR calculated by the image quality deterioration degree calculator 117, the filter intensity calculator 118 calculates the image quality deterioration degree filter intensity as shown in FIG. 2. When the value of the PSNR is small, the possibility of the generation of noise by image quality deterioration is high, so the filter intensity is increased. On the other hand, when the value of the PSNR is large, the possibility of the generation of noise by image quality deterioration is low, so the filter intensity is decreased. Note that the larger the value, the higher the filter intensity, and it is possible to set 13 ranks of the filter intensity from −6 to +6. However, the number of ranks of the filter intensity is not limited to this, and can also be larger or smaller.

As described above, the image quality deterioration degree filter intensity calculated in accordance with the PSNR as an objective image quality evaluation value is temporally stable and desirable to hold the continuity of the moving image quality, from the viewpoint of the characteristic of the PSNR as an index. However, the image quality deterioration degree filter intensity is not necessarily an image quality evaluation value capable of correctly expressing image quality deterioration caused by block noise. Therefore, this image quality deterioration degree filter intensity is corrected by a method to be described later.

[Pattern Information Calculator 119]

Figure 3:
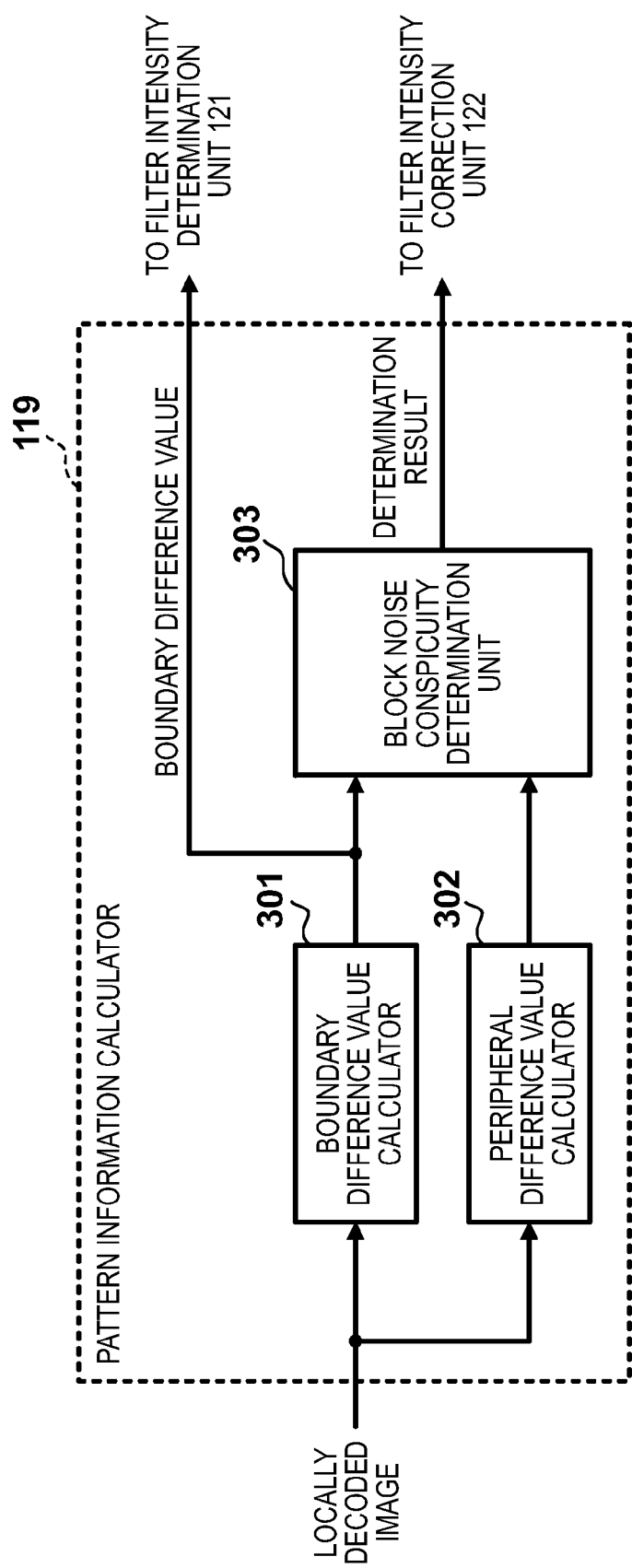
FIG. 3 is a view for explaining a pattern information calculation method in the first embodiment.
Figure 4:
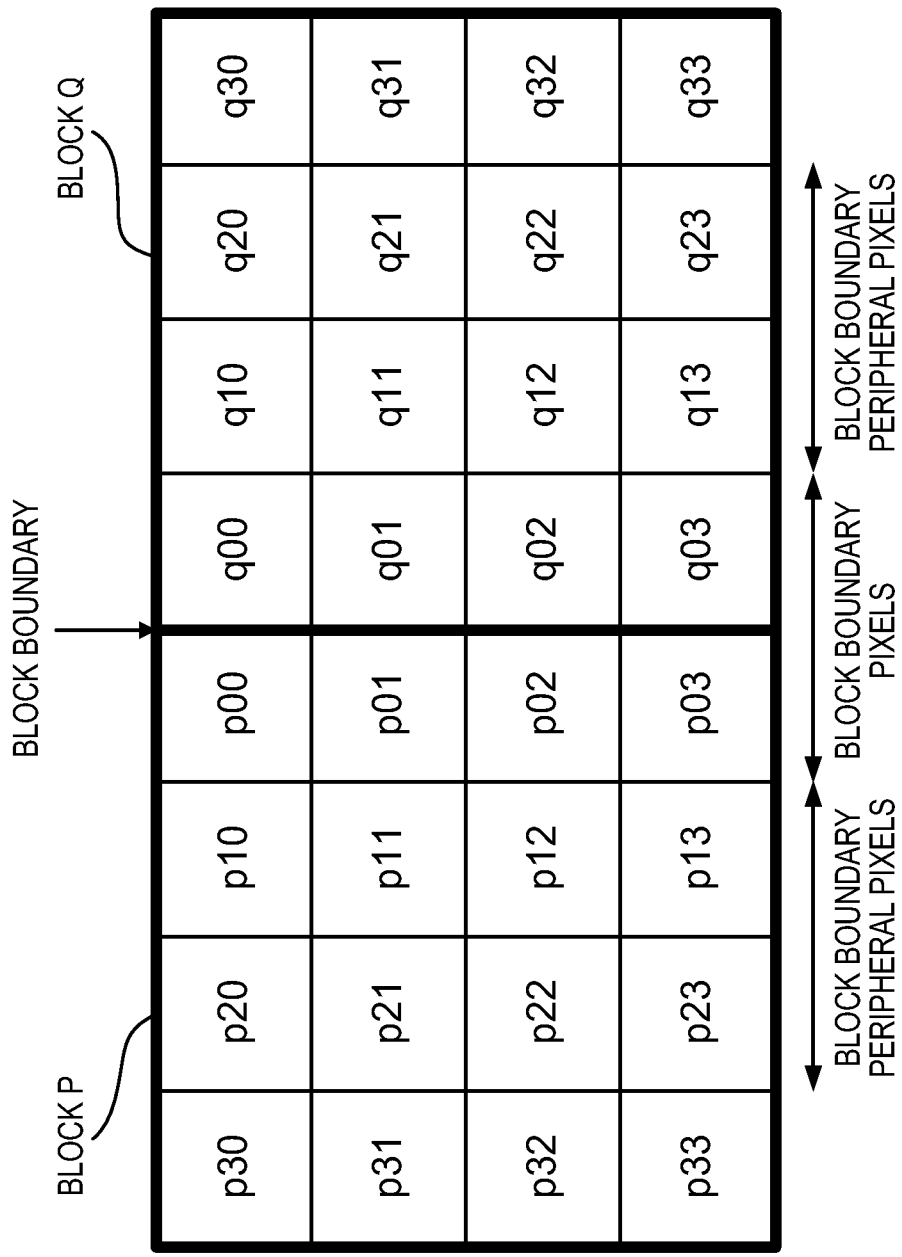
FIG. 4 is a view for explaining block noise conspicuity determination in the first embodiment.

The pattern information calculator 119 will be explained in detail below with reference to FIGS. 3 and 4. FIG. 3 is a view showing an example of the arrangement of the pattern information calculator 119. The operation of the pattern information calculator 119 will be explained below.

A boundary difference calculator 301 calculates the average value of difference absolute values between adjacent pixels in a block boundary of a locally decoded image, as "a boundary difference value". A peripheral difference calculator 302 calculates the average value of difference absolute values between adjacent pixels in a block boundary periphery of a locally decoded image, as "a peripheral difference value". The calculated difference values are output to a block noise conspicuity determination unit 303.

Next, the block boundary and block boundary periphery will be explained with reference to FIG. 4. FIG. 4 is a view showing pixels of locally decoded images of block P and block Q. Referring to FIG. 4, each square such as p00 or q00 indicates a pixel. Since the image encoding apparatus encodes (orthogonally transforms) an original image by dividing it into a plurality of blocks, a plurality of block boundaries are formed in a locally decoded image. FIG. 4 shows an example of a vertical block boundary when each block has 4 pixels×4 pixels. The vertical block boundary exists between, for example, p00 and q00 shown in FIG. 4. Note that in FIG. 4, block Q is a block to be processed, and block P is an already processed block. Block noise is perceived due to the pixel level difference between pixels (block boundary pixels) sandwiching the block boundary. The boundary difference calculator 301 first calculates a difference absolute value between horizontal pixels (block boundary pixels) adjacent to each other on the two sides of the block boundary shown in FIG. 4. That is, the boundary difference calculator 301 calculates |p00−q00|, |p01−q01|, |p02−q02|, and |p03−q03|. Then, the boundary difference calculator 301 outputs the average value of the thus calculated difference absolute values between the four pairs of adjacent pixels, as a boundary difference value.

On the other hand, the peripheral difference calculator 302 calculates difference values between adjacent pixels other than the block boundary pixels. In the example shown in FIG. 4, the peripheral difference calculator 302 calculates difference absolute values between horizontal adjacent pixels (block boundary periphery pixels) horizontally spaced apart by one pixel from the block boundary. That is, the peripheral difference calculator 302 calculates |P20−p10|, |p21−p11|, |p22−p12|, |p23−p13|, |q20−q10|, |q21−q11|, |q22−q12|, and |q23−q13|.

Pixels as targets of the peripheral difference value calculation are of course not limited to these pixels. It is also possible to calculate difference absolute values between adjacent pixels over a range broader than that of the above-described pixels, and pixels as targets of the difference absolute value calculation need not be adjacent pixels. For example, a difference absolute value between a given pixel and a pixel spaced apart by two pixels from the given pixel can also be calculated. The peripheral difference calculator 302 outputs the average value of the eight difference absolution values calculated as described above, as the peripheral difference value.

The method of calculating the average value of difference absolute values between horizontal adjacent pixels with respect to a vertical block boundary has been explained above. However, it is also possible to similarly calculate the average value of difference absolute values between vertical adjacent pixels with respect to a horizontal block boundary. For example, in the locally decoded image of block Q shown in FIG. 4, the calculation can be performed between block Q and a block of a locally decoded image positioned above block Q.

The block noise conspicuity determination unit 303 shown in FIG. 3 will now be explained. Block noise is generally generated in accordance with the difference between the pixel value levels of pixels sandwiching the block boundary. That is, if the boundary difference value is large, block noise is highly likely to be generated. However, the visual performance of a human has the feature that even when the boundary difference values are the same, block noise is more conspicuous when a pattern in the block boundary periphery is flat than when the pattern is complicated. That is, since a flat pattern has a small peripheral difference value, the boundary difference value is relatively emphasized, and this makes block noise in the block boundary conspicuous. On the other hand, since a complicated pattern has a large peripheral difference value, the boundary difference value is embedded in the peripheral difference value, and as a consequence block noise in the block boundary becomes inconspicuous.

By using this feature, the block noise conspicuity determination unit 303 compares the boundary difference value output from the boundary difference calculator 301 with the peripheral difference value output from the peripheral difference calculator 302, thereby calculating the ratio or difference. The conspicuity of block noise can be determined based on this ratio or difference. For example, if the boundary difference value is larger than the peripheral difference value, it is determined that block noise is conspicuous. In this case, the ratio of the boundary difference value to the peripheral difference value is 1.0 or more, and the difference between them is a positive value of 0.0 or more. On the other hand, if the boundary difference value is smaller than the peripheral difference value, it is determined that block noise is inconspicuous. In this case, the ratio of the boundary difference value to the peripheral difference value is less than 1.0, and the difference between them is a negative value less than 0.0.

The pattern information calculator 119 outputs the boundary difference value calculated for each block boundary to the filter intensity determination unit 121. Also, as the block noise conspicuity determination result, the pattern information calculator 119 outputs the ratio of the boundary difference value to the peripheral difference value or the difference between them to the filter intensity correction unit 122.

[Encoding Information Calculator 120]

The encoding information calculator 120 will be explained in detail below. The encoding information calculator 120 collects the encoding efficiency and the encoding parameters of encoding related to the generation of block noise from a controller or the like of the moving image encoding apparatus, and outputs the collected information as encoding information. Examples of information to be output as the encoding information are the following five items.

(1) Code amount average: When the code amount is small, block noise is easily generated. Code amounts within a predetermined range are averaged and output as the encoding information.

(2) Quantization step average: When quantization steps are coarse, a quantization error occurs, and block noise is easily generated. Quantization steps within a predetermined range are averaged and output as the encoding information.

(3) Intra prediction mode ratio: Since the encoding efficiency of intra prediction is generally lower than that of inter prediction, block noise is easily generated in intra prediction. Therefore, the ratio of an intra prediction mode in prediction modes adopted in a predictive encoding processing within a predetermined range is calculated and output as the encoding information.

(4) Motion vector randomness: If the magnitudes and directions of motion vectors are random between blocks, it is highly likely that the motion prediction accuracy is low, so the encoding efficiency decreases, and block noise is easily generated. The standard deviations of the magnitudes and directions of motion vectors within a predetermined range are calculated and output as the encoding information.

(5) Ratio of large orthogonal transformation size: The block sizes of orthogonal transformation are a 4×4 pixel size and 8×8 pixel size. When the block size is large, however, the size of the generation of block noise is also large, so block noise becomes conspicuous. Therefore, the ratio at which the large orthogonal transformation size is selected is calculated and output as the encoding information.

The above-described image quality deterioration degree, pattern information, and encoding information can also be averaged within a predetermined range. This predetermined range can be regarded as a region defined for, for example, each block, each slice, or each frame. Practical examples are a predetermined region (for example, a region defined for each block or each slice) in one frame, and the whole region of one frame. Also, extremely changing the filter intensity for each frame of a moving image is undesirable because the continuity of the image quality may be degraded. Accordingly, a plurality of frames may also be set as a predetermined range. Furthermore, since the degree of the generation of block noise changes from one picture type to another, it is also possible to set a predetermined range for each frame of each picture type. In the H.264 standards, the filter intensity can be changed for each slice. When a predetermined range is set for each slice, therefore, control is presumably easy because the unit of the predetermined range matches that of the filter intensity.

[Filter Intensity Determination Unit 121]

The filter intensity determination unit 121 will be explained in detail below with reference to FIG. 5. The filter intensity determination unit 121 determines whether the image quality deterioration degree filter intensity is appropriate for a locally decoded image, in accordance with the pattern information and encoding information.

First, the filter intensity determination unit 121 calculates an estimated filter intensity that is estimated to be appropriate, based on the pattern information and encoding information. This calculation method will be explained with reference to FIG. 5. The example shown in FIG. 5 will be explained by assuming that the encoding information and pattern information are values averaged within a predetermined range (for example, a slice). Note that the value of a locally decoded image as a processing target may also be used as the pattern information.

FIG. 5 is a view showing a method in which scoring is performed based on the block noise generation possibility derived from a total of six evaluation items of the encoding information and pattern information, and the estimated filter intensity is calculated from the total points. The points are, for example, −6 to +6, and scoring is performed such that a positive value is given to an item for which the block noise generation possibility is high, and a negative value is given to an item for which the block noise generation possibility is low. In this method, the range between a minimum value and maximum value assumed for each item is divided into 13 ranks, and a point is allocated to each rank.

First, for the code amount average value of the encoding information, the threshold value of the code amount average value is set between the assumed maximum and minimum values for each point to be allocated, and a point is calculated by threshold processing. This threshold value is determined based on, for example, the resolution, frame rate, and bit depth of a target image to be encoded. In the example shown in FIG. 5, predetermined threshold processing allocates a point of −1 to a code amount average value of 3,000. That is, it is determined that a code amount average value of 3,000 is a slightly large code amount, so a minus point indicating a low block noise generation possibility is allocated.

Next, for the quantization step average value of the encoding information, the threshold value of the quantization step average value is set between the assumed maximum and minimum values for each point to be allocated, and a point is calculated by threshold processing. In the example shown in FIG. 5, predetermined threshold processing allocates a point of +5 to a quantization step average value of 48. That is, it is determined that a quantization step average value of 48 indicates very coarse quantization steps, so a plus point indicating a high block noise generation possibility is allocated.

For the intra prediction mode ratio of the encoding information, the threshold value of the intra prediction mode ratio is set between the assumed maximum and minimum values for each point to be allocated, and a point is calculated by threshold processing. In the example shown in FIG. 5, predetermined threshold processing allocates a point of −2 to an intra prediction mode ratio of 10%. That is, it is determined that an intra prediction mode ratio of 10% is a low intra prediction mode ratio, so a minus point indicating a low block noise generation possibility is allocated.

For the motion vector randomness of the encoding information, the threshold value of the motion vector randomness is set between the assumed maximum and minimum values for each point to be allocated, and a point is calculated by threshold processing. In the example shown in FIG. 5, predetermined threshold processing allocates a point of −5 to a motion vector randomness of 10. That is, it is determined that a motion vector randomness of −5 is a low motion vector randomness, so a minus point indicating a low block noise generation possibility is allocated.

For the ratio of a large orthogonal transformation size of the encoding information, the threshold value of the ratio of a large orthogonal transformation size is set between the assumed maximum and minimum values for each point to be allocated, and a point is calculated by threshold processing. In the example shown in FIG. 5, predetermined threshold processing allocates a point of +2 to a ratio of a large orthogonal transformation size of 80%. That is, it is determined that a ratio of a large orthogonal transformation size of 80% is a high ratio of a large orthogonal transformation size, so a plus point indicating a high block noise conspicuity is allocated.

Finally, for the boundary difference value of the pattern information, the threshold value of the boundary difference value is set between the assumed maximum and minimum values for each point to be allocated, and a point is calculated by threshold processing. In the example shown in FIG. 5, predetermined threshold processing allocates a point of +6 to a boundary difference value of 77. That is, it is determined that a boundary difference value of 77 is a large value, so a plus point indicating a high block noise generation possibility is allocated.

The total score of the individual evaluation items calculated as described above is the estimated filter intensity. That is, the estimated filter intensity is +5 in the example shown in FIG. 5. The filter intensity determination unit 121 outputs this estimated filter intensity to the filter intensity correction unit 122.

[Filter Intensity Correction Unit 122]

The filter intensity correction unit 122 will be explained in detail below with reference to FIG. 6. The filter intensity correction unit 122 corrects the image quality deterioration degree filter intensity in accordance with the estimated filter intensity generated by the filter intensity determination unit 121 and the pattern information (block noise conspicuity), and outputs the corrected filter intensity to the deblocking filter 112. Note that in this embodiment, an example in which the difference between the boundary difference value and peripheral difference value is used as the block noise conspicuity determination result will be explained.

First, the correction amount of the image quality deterioration degree filter intensity is calculated based on (Estimated filter intensity−image quality deterioration degree filter intensity)×ABS (block noise conspicuity×$K$)  (2)

Correction is performed by adding the correction amount of the image quality deterioration degree filter intensity thus calculated to the image quality deterioration degree filter intensity. Note that if the estimated filter intensity matches the image quality deterioration degree filter intensity, it is determined that the calculated filter intensity is appropriate, and no correction is performed. K is a positive constant, and plays a role of adjusting the value of the block noise conspicuity (the difference between the boundary difference value and peripheral difference value). For example, the constant K is 0.01. ABS(P) indicates a function of calculating the absolute value of P.

Four cases shown in FIG. 6 will be explained below as practical examples.

(1) Case of No. 1 in FIG. 6

This is a case in which block noise is conspicuous and the image quality deterioration degree filter intensity is lower than the estimated filter intensity, such that the estimated filter intensity is +5, the image quality deterioration degree filter intensity is +3, and the block noise conspicuity is 50. In this case, it is highly likely that the uncorrected image quality deterioration degree filter intensity cannot reduce the conspicuous block noise, so correction is performed to increase the image quality deterioration degree filter intensity. In this case, the correction amount of the image quality deterioration degree filter intensity calculated based on equation (2) described above is +1, and the corrected filter intensity calculated by the filter intensity correction unit 122 is +4. This means that the filter intensity is increased by +1 from that before the correction.

(2) Case of No. 2 in FIG. 6

This is a case in which block noise is conspicuous and the image quality deterioration degree filter intensity is higher than the estimated filter intensity, such that the estimated filter intensity is +3, the image quality deterioration degree filter intensity is +5, and the block noise conspicuity is 50. In this case, it is highly likely that the uncorrected image quality deterioration degree filter intensity not only reduces the conspicuous block noise but also blurs even a complicated pattern, so correction is performed to decrease the image quality deterioration degree filter intensity. In this case, the correction amount of the image quality deterioration degree filter intensity calculated based on equation (2) described above is −1, and the corrected filter intensity calculated by the filter intensity correction unit 122 is +4. This means that the filter intensity is decreased by −1 from that before the correction.

(3) Case of No. 3 in FIG. 6

This is a case in which block noise is inconspicuous and the image quality deterioration degree filter intensity is lower than the estimated filter intensity, such that the estimated filter intensity is +5, the image quality deterioration degree filter intensity is +3, and the block noise conspicuity is −50. In this case, it is unnecessary to increase the filter intensity because the block noise is inconspicuous. If the filter intensity is increased, a rough pattern may be blurred. If the filter intensity is decreased, the inconspicuous block noise may become conspicuous. In this case, therefore, the image quality deterioration degree filter intensity is not corrected. That is, the filter intensity correction unit 122 does not correct the input image quality deterioration degree filter intensity, but outputs a filter intensity of +3.

(4) Case of No. 4 in FIG. 6

This is a case in which block noise is inconspicuous and the image quality deterioration degree filter intensity is higher than the estimated filter intensity, such that the estimated filter intensity is +3, the image quality deterioration degree filter intensity is +5, and the block noise conspicuity is −50. In this case, it is highly likely that the uncorrected image quality deterioration degree filter intensity not only reduces conspicuous block noise but also blurs even a complicated pattern, so correction is performed to decrease the image quality deterioration degree filter intensity. In this case, the correction amount of the image quality deterioration degree filter intensity calculated based on equation (2) described above is −1, and the corrected filter intensity calculated by the filter intensity correction unit 122 is +4. This means that the filter intensity is decreased by −1 from that before the correction.

As described above, the filter intensity correction unit 122 corrects the image quality deterioration degree filter intensity, and outputs the corrected filter intensity to the deblocking filter 112.

Note that in the above-described explanation of the constant K of equation (2), a fixed value is set regardless of the conspicuity of block noise. However, the constant K may also be changed in accordance with the conspicuity of block noise. For example, when the value of the constant K is changed in accordance with whether block noise is conspicuous or inconspicuous, it is possible to adjust the correction amount of the image quality deterioration degree filter intensity in accordance with whether block noise is conspicuous or inconspicuous.

Note that instead of decreasing the filter intensity, it is also possible to perform control by using the switch 111 so as not to perform any deblocking filter processing on a locally decoded image. For example, when the estimated filter intensity is −20, this filter intensity is much lower than a minimum filter intensity of −6 at which the deblocking filter 112 performs filter processing. Therefore, the filter intensity correction unit may supply a switching signal to the switch 111, thereby bypassing the deblocking filter 112. In this case, no deblocking filter processing is performed on a locally decoded image. The condition under which the deblocking filter 112 is bypassed can be an estimated filter intensity lower than a predetermined value (for example, −10).

Figure 7:
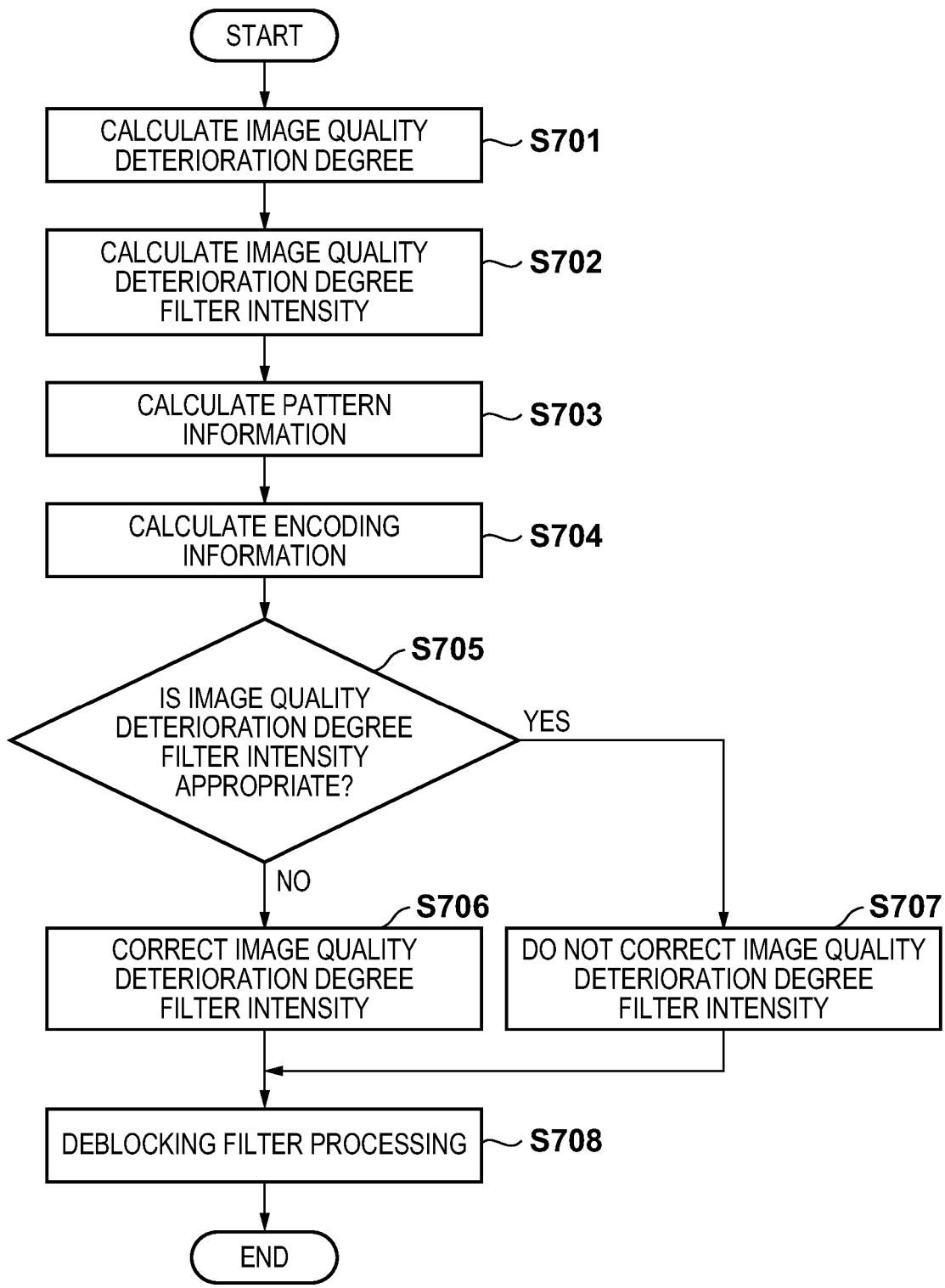
FIG. 7 is a flowchart corresponding to an example of a filter intensity calculation processing in the first embodiment.

The processes of the individual blocks explained above will be explained below with reference to FIG. 7, as a series of processes of calculating the filter intensity of the deblocking filter processing according to this embodiment.

First, in step S701, the image quality deterioration degree calculator 117 calculates the image quality deterioration degree in accordance with an original image and locally decoded image. Then, in step S702, the filter intensity calculator 118 calculates the image quality deterioration degree filter intensity in accordance with the image quality deterioration degree. Subsequently, in step S703, the pattern information calculator 119 calculates the pattern information. In step S704, the encoding information calculator 120 calculates the encoding information. In step S705, the filter intensity determination unit 121 determines whether the image quality deterioration degree filter intensity is appropriate for the locally decoded image, in accordance with the pattern information and encoding information. If it is determined that the image quality deterioration degree filter intensity is inappropriate ("NO" in step S705), the process advances to step S706. In step S706, the filter intensity correction unit 122 corrects the image quality deterioration degree filter intensity in accordance with the determination result from the filter intensity determination unit 121, and the pattern information (block noise conspicuity). Also, the filter intensity correction unit 122 outputs the corrected filter intensity to the deblocking filter 112. If it is determined that the image quality deterioration degree filter intensity is appropriate ("YES" in step S705), the process advances to step S707. In step S707, the filter intensity correction unit 122 does not correct the image quality deterioration degree filter intensity but outputs it to the deblocking filter 112. In step S708, the deblocking filter 112 performs the deblocking filter processing based on the filter intensity output from the filter intensity correction unit 122.

Second Embodiment

Figure 8:
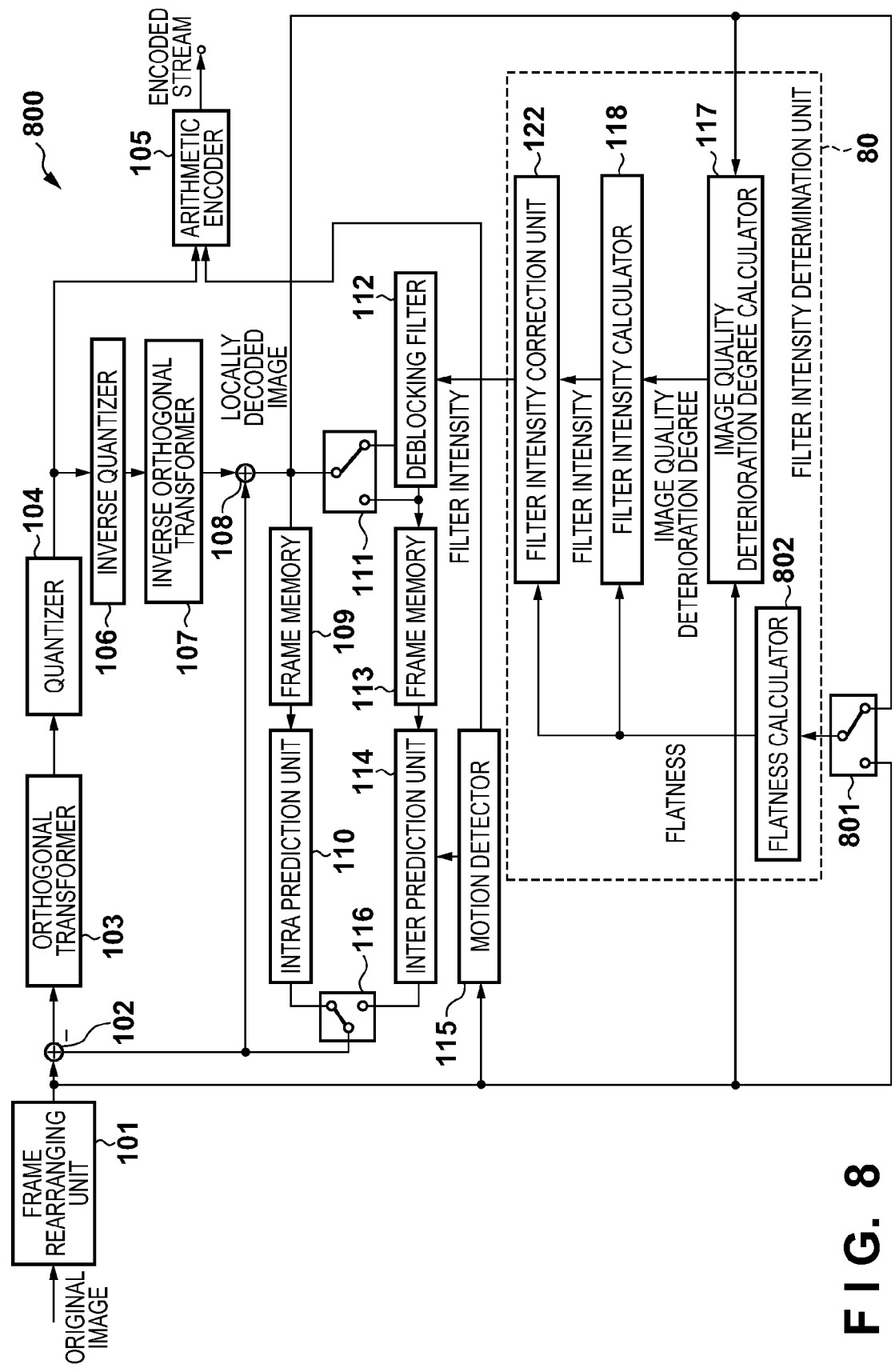
FIG. 8 is a view showing an example of the arrangement of a moving image encoding apparatus according to the second embodiment.

FIG. 8 is a block diagram showing an example of a moving image encoding apparatus according to the second embodiment of the present invention. This encoding apparatus according to the second embodiment is a moving image encoding apparatus that performs deblocking filter processing based on the filter intensity calculated in accordance with the image quality deterioration degree and flatness of an original image and locally decoded image. The arrangement example of the present invention will be explained below with reference to FIG. 8.

The basic configuration of a moving image encoding apparatus 800 according to this embodiment is the same as that of the moving image encoding apparatus 100 of the first embodiment. That is, the moving image encoding apparatus 800 includes a frame rearranging unit 101, subtracter 102, orthogonal transformer 103, quantizer 104, arithmetic encoder 105, inverse quantizer 106, inverse orthogonal transformer 107, adder 108, frame memories 109 and 113, intra prediction unit 110, switches 111 and 116, deblocking filter 112, inter prediction unit 114, motion detector 115, image quality deterioration degree calculator 117, filter intensity calculator 118, and filter intensity correction unit 122. The feature of the encoding apparatus 800 is that it further includes a switch 801 and flatness calculator 802. The encoding apparatus 800 according to the second embodiment divides an input original image into blocks each having a predetermined number of pixels, performs a predictive encoding processing for each block, and outputs an encoded stream.

In the moving image encoding apparatus shown in FIG. 8, each block can be formed by hardware by using a dedicated logic circuit or memory. Alternatively, each block can be formed by software by executing a processing program stored in a memory by using a computer such as a CPU.

The encoding processing of the moving image encoding apparatus 800 will now be explained, but an explanation of portions having the same contents as those explained in the first embodiment will be omitted. More specifically, the operations performed by the components from the frame rearranging unit 101 to the switch 116 are the same as those of the first embodiment, so a repetitive explanation thereof will be omitted.

The image quality deterioration calculator 117 calculates the image quality deterioration degree between an original image and a locally decoded image obtained by encoding the original image and locally decoding the encoded image. The image quality deterioration degree is calculated for each small region of an image. Note that the original image and locally decoded image for calculating the image quality deterioration degree have phases matched in the moving image encoding apparatus, and they are images of the same frame. The filter intensity calculator 118 calculates the filter intensity for each small region in accordance with the flatness calculated by the flatness calculator 802 and the image quality deterioration degree calculated by the image quality deterioration degree calculator 117.

The switch 801 is a selector for selecting whether to input the original image or locally decoded image to the flatness calculator 802. The switching by the switch 801 can be performed dynamically or in accordance with a user's operation, and can also be set as a default. As a practical switching criterion, the original image can be selected when the visual characteristics during encoding are regarded as important. On the other hand, the locally decoded image can be selected when the visual characteristics during playback are regarded as important.

The flatness calculator 802 calculates the flatness of a pattern for each small region of the image. A practical method of calculating the flatness will be described later. The filter intensity correction unit 122 corrects the filter intensity calculated by the filter intensity calculator 118 in accordance with the flatness calculated by the flatness calculator 802, and outputs the corrected filter intensity to the deblocking filter 112. Note that the image quality deterioration degree calculator 117, filter intensity calculator 118, flatness calculator 802, and filter intensity correction unit 122 will collectively be called a filter intensity determination unit 80.

The foregoing is an explanation of the encoding apparatus according to the second embodiment. Note that in the second embodiment, an arrangement that calculates the filter intensity by using the locally decoded image before the deblocking filter processing is performed on it will be explained. However, the filter intensity may also be calculated by using the locally decoded image having undergone the deblocking filter processing. When calculating the filter intensity by using the locally decoded image having undergone the deblocking filter processing, the filter intensity is calculated in accordance with the image quality deterioration degree and flatness of the image having undergone the filter processing.

Next, details of the processes in the flatness calculator 802, image quality deterioration degree calculator 117, filter intensity calculator 118, and filter intensity correction unit 122 will be explained.

(Flatness Calculator 802)

First, the flatness calculator 802 will be explained in detail below with reference to FIG. 9A. The flatness calculator 802 calculates the flatness of an image selected from an original image and locally decoded image by the switch 801. A method of calculating the flatness will be explained.

First, an image selected by the switch 801 is input to the flatness calculator 802. The input image is divided into blocks (small regions) having a predetermined size. The predetermined size can be, for example, a size of 16 pixels× 16 pixels. After that, the variance of pixel values is calculated for each divided block. The variance is an index indicating the dispersion of pixel values. The variance is small for a flat pattern, and large for a complicated pattern. The variance can be obtained by calculating the difference value between a pixel of interest and an adjacent pixel for each pixel in a block, and integrating the obtained difference values.

Based on this variance of each block, the flatness calculator 802 calculates the flatness of each block. That is, the flatness increases as the variance decreases, and decreases as the variance increases. FIG. 9A shows examples of the flatness. FIG. 9A is a view showing the flatness calculated by the flatness calculator 802, in which the flatness of each block is represented by a number. FIG. 9A shows an example in which an image is divided into 8×6 blocks. The flatness is represented by 10 ranks from 0 to 9: a block having a flatness of 0 is a flat pattern, and a block having a flatness of 9 is a complicated pattern. For example, a block 901 in the upper right corner of FIG. 9A is a relatively flat pattern because the flatness is 1, and a block 902 in the lower left corner of FIG. 9A is a complicated pattern because the flatness is 9. Note that the variance can be converted into the flatness by preparing threshold values corresponding to the individual ranks of the flatness, and performing threshold processing by which the variance is allocated to one of the 10 ranks by using the threshold values. As described above, the flatness calculator 802 calculates the flatness of each block of the image selected by the switch 801, and outputs the flatness to the filter intensity calculator 118 and filter intensity correction unit 122.

(Image Quality Deterioration Degree Calculator 117)

Next, the operation of the image quality deterioration degree calculator 117 according to the second embodiment will be explained in detail with reference to FIG. 9B. The image quality deterioration degree calculator 117 receives an original image and locally decoded image, and calculates the difference between the original image and locally decoded image, that is, the image quality deterioration degree caused by encoding. Examples of the image quality deterioration degree are the difference absolute value sum total and PSNR (Peak Signal to Noise Ratio) of each block. Methods of calculating the difference absolute value sum total and PSNR will be explained below.

First, two images, that is, an original image and locally decoded image are input to the image quality deterioration degree calculator 117. The two input images are divided into blocks (small regions) having a predetermined size. The predetermined size can be, for example, a size of 16 pixels× 16 pixels. After that, the difference absolute value sum total of pixel values or the PSNR between the two images is calculated for each divided block. The difference absolute value sum total is a value obtained by calculating the sum total of the absolute value differences between pixels in corresponding positions of images of blocks of the original image and locally decoded image. The PSNR is an index representing the difference between two images: the difference between pixel values of the original image and locally decoded image increases as the value of the PSNR decreases, and decreases as the value of the PSNR increases. The PSNR is calculated by equation (1) presented earlier by using the locally decoded image and original image.

Based on the difference absolute value sum total or PSNR of each block, the image quality deterioration degree calculator 117 calculates the image quality deterioration degree of each block. That is, the image quality deterioration degree decreases as the difference absolute value sum total decreases or the value of the PSNR increases, and increases as the difference absolute value sum total increases or the value of the PSNR decreases. FIG. 9B shows examples of the image quality deterioration degree. FIG. 9B is a view showing the image quality deterioration degrees calculated by the image quality deterioration degree calculator 117, in which the image quality deterioration degree of each block is represented by a number. FIG. 9B shows an example in which an image is divided into 8×6 blocks. The image quality deterioration degree is represented by 10 ranks from 0 to 9: a block having an image quality deterioration degree of 9 is a region having a high image quality deterioration degree, and a block having an image quality deterioration degree of 0 is a region having a low image quality deterioration degree. For example, a block 903 in the upper right corner of FIG. 9B is a region having a relatively low image quality deterioration degree because the image quality deterioration degree is 1, and a block 904 in the lower left corner of FIG. 9B is a region having a relatively high image quality deterioration degree because the image quality deterioration degree is 7. Note that the difference absolute value sum total or PSNR can be converted into the image quality deterioration degree by performing, for example, threshold processing in the same manner as for the flatness.

As described above, the image quality deterioration degree calculator 117 calculates the image quality deterioration degree between the original image and locally decoded image, and outputs the image quality deterioration degree to the filter intensity calculator 118.

(Filter Intensity Calculator 118)

The operation of the filter intensity calculator 118 according to the second embodiment will be explained in detail below with reference to FIGS. 10 and 11. The filter intensity calculator 118 calculates the filter intensity for each block in accordance with the flatness calculated by the flatness calculator 802 and the image quality deterioration degree calculated by the image quality deterioration degree calculator 117.

First, the relationship between the image quality deterioration degree and filter intensity will be explained. In the second embodiment, the difference between an original image and locally decoded image, that is, the degree of deterioration of the image quality caused by encoding is the image quality deterioration degree. When this image quality deterioration degree caused by encoding is large, the possibility that large block noise is generated is high. To reduce large block noise like this, filter processing must be performed with high filter intensity. When the image quality deterioration degree caused by encoding is small, the possibility that block noise is generated is low. If filter processing is performed with high filter intensity in a case like this, a pattern of the image may be blurred, so filter processing must be performed with low filter intensity. That is, when the image quality deterioration degree is large, block noise can be reduced by performing filter processing with high filter intensity. Also, when the image quality deterioration degree is small, a blur of a pattern of the image can be reduced by performing filter processing with low filter intensity.

Next, the relationship between the flatness and filter intensity will be explained. In the second embodiment, the flatness of an original image or locally decoded image is calculated. The visual performance of a human generally has the feature that image quality deterioration occurring in a flat pattern portion is more conspicuous than that occurring in a complicated pattern portion. That is, block noise generated in a flat pattern portion is more conspicuous than that generated in a complicated pattern portion due to the visual performance, even when these block noise components have the same magnitude. To reliably reduce block noise generated in a flat pattern portion, filter processing is performed with high filter intensity. On the other hand, if filter processing is performed with high filter intensity for inconspicuous block noise generated in a complicated pattern portion, not only the inconspicuous block noise is reduced, but also the pattern of the image is blurred. Therefore, filter processing must be performed with low filter intensity. That is, conspicuous block noise generated in a flat pattern portion can be reduced by performing filter processing with high filter intensity. Also, when filter process is performed with low filter intensity for block noise generated in a complicated pattern portion, a blur of the pattern of the image can be reduced.

As described above, the filter intensity calculator 118 calculates the filter intensity for each block in accordance with the image quality deterioration degree and flatness. The method of calculating the filter intensity for each block will be explained below with reference to FIG. 10. FIG. 10 is a view showing the relationship between the image quality deterioration degree, flatness, and filter intensity, when the image quality deterioration degree, flatness, and filter intensity are respectively plotted on the X-axis, Y-axis, and Z-axis. Note that the larger the value, the higher the filter intensity, and it is possible to set 13 ranks of the filter intensity from −6 to +6.

Figures 10, 11:
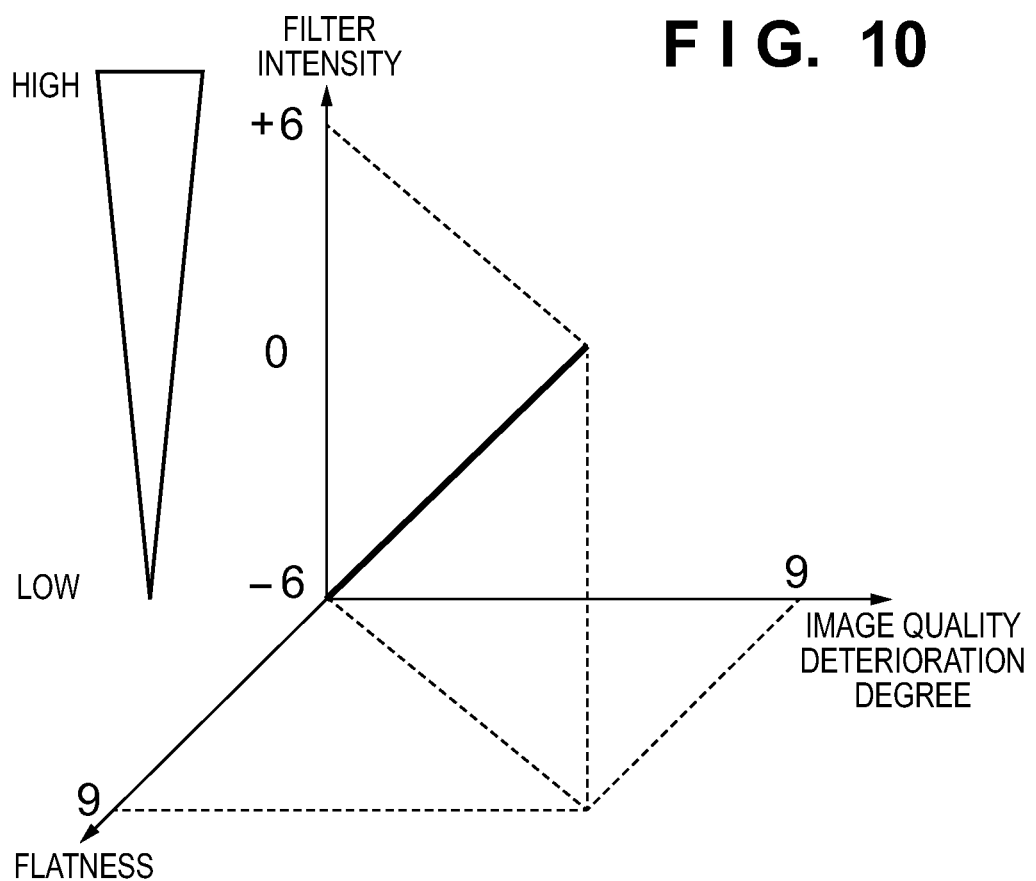
FIG. 10 is a view for explaining a filter intensity calculation method in the second embodiment.
FIG. 11 is a view showing examples of the filter intensity calculated in the second embodiment.

FIG. 10 shows an example in which a highest filter intensity of +6 is calculated when the flatness is 9 and the image quality deterioration degree is 9, and a lowest filter intensity of −6 is calculated when the flatness is 0 and the image quality deterioration degree is 0. That is, the filter intensity calculator 118 calculates the highest filter intensity when a pattern is flat and the image quality deterioration degree is large, and the lowest filter intensity when a pattern is complicated and the image quality deterioration degree is small. For the examples of the flatness shown in FIG. 9A and the examples of the image quality deterioration degree shown in FIG. 9B, the filter intensity calculator 118 calculates filter intensities as shown in FIG. 11 based on, for example, $$Vs = \tfrac{2}{3}(Vf + Vd) - 6 \qquad (3)$$

where Vs represents the filter intensity, Vf represents the flatness, and Vd represents the image quality deterioration degree. Note that the calculation result of equation (3) is rounded off to the nearest whole number.

Note that when the flatness is 0 and the image quality deterioration degree is 0, it is also possible to perform control so as not to perform any deblocking filter processing on the locally decoded image by using the switch 111, instead of calculating a lowest filter intensity of −6.

Referring to FIG. 8, the switch 801 can select one of an original image and locally decoded image as an image for which the flatness calculator 802 calculates the flatness. When actually watching an encoded image, the encoded image is decoded before being watched. Accordingly, when controlling the filter intensity in accordance with how image quality deterioration is seen when a decoded image is watched, the filter intensity is preferably calculated in accordance with the flatness of a locally decoded image. However, a locally decoded image contains noise generated by encoding, and this noise may make an accurate flatness impossible to calculate. On the other hand, an original image is an unencoded image and hence contains no encoding noise unlike in a locally decoded image, so the flatness can be calculated without any influence of encoding noise. Therefore, it is also possible to calculate the flatness by using a locally decoded image when it is predicted that the generation of encoding noise is small such as when the encoding bit rate is high, and calculate the flatness by using an original image when it is predicted that the generation of encoding noise is large such that the encoding bit rate is low.

(Filter Intensity Correction Unit 122)

The operation of the filter intensity correction unit 122 according to the second embodiment will be explained in detail below with reference to FIGS. 9A, 9B, 11, 12, 13A, 13B, 13C, and 14.

Figure 12:
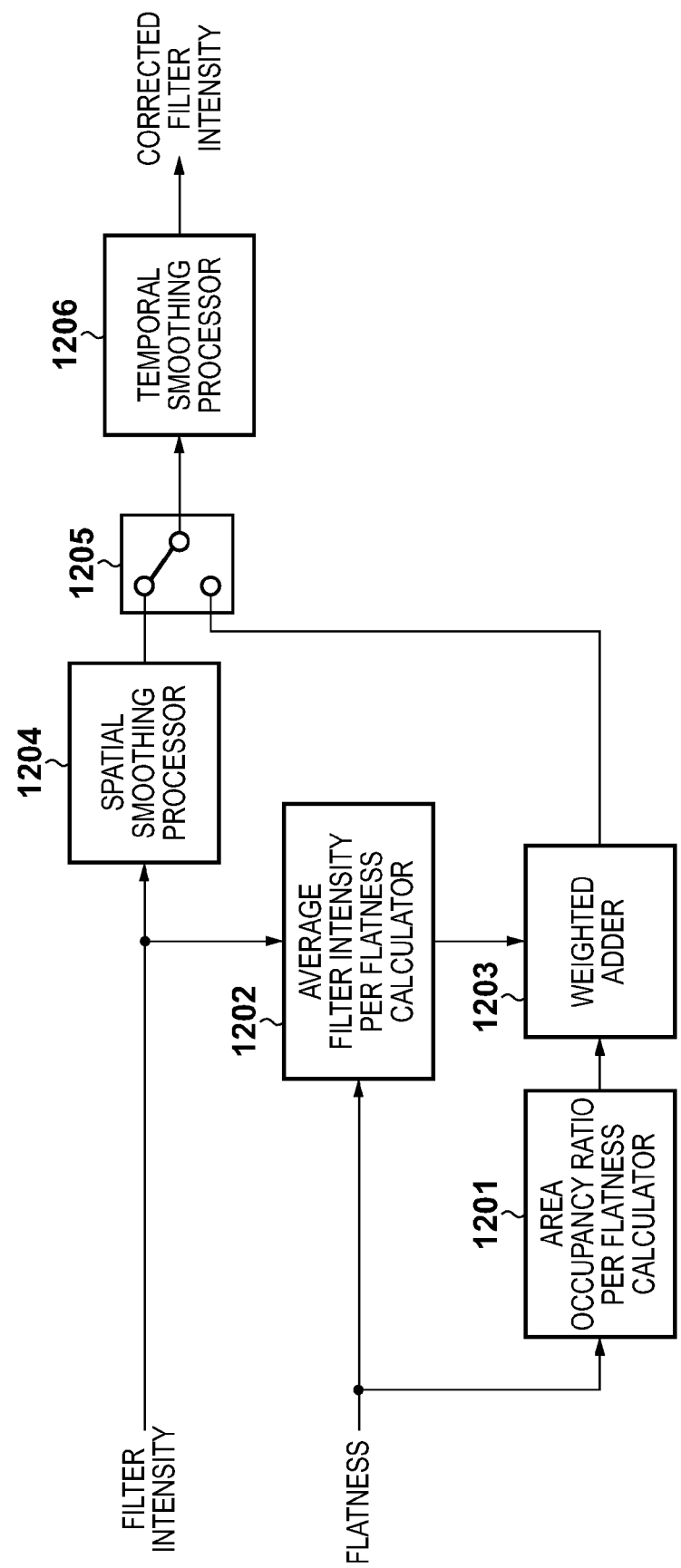
FIG. 12 is a view showing an example of the arrangement of a filter intensity correction unit 122 in the second embodiment.

FIG. 12 is a view showing an example of the arrangement of the filter intensity correction unit 122 according to the second embodiment. The filter intensity correction unit 122 includes an area occupancy ratio per flatness calculator 1201, average filter intensity per flatness calculator 1202, weighted adder 1203, spatial smoothing processor 1204, switch 1205, and temporal smoothing processor 1206. The filter intensity correction unit 122 corrects the filter intensity in accordance with the flatness, and outputs the corrected filter intensity.

The area occupancy ratio per flatness calculator 1201 calculates the area of blocks having the same flatness, and calculates the ratio occupied by the area in the whole area as the area occupancy ratio. In the example shown in FIG. 9A, an area having a flatness of 8 is 5 when the area of one block is 1. The area occupancy ratio is 5/48=0.104. The area occupancy ratio per flatness calculator 1201 calculates this area occupancy ratio for all the flatnesses. In the example shown in FIG. 9A, blocks having flatnesses of 0 to 9 exist, so a total of 10 area occupancy ratios are calculated for these flatnesses. For flatnesses of 0 to 4, the area is 1, so the area occupancy ratio is 1/48=0.021. For flatnesses of 5 and 6, the area is 4, so the area occupancy ratio is 4/48=0.083. For a flatness of 7, the area is 5, so the area occupancy ratio is 5/48=0.104. For a flatness of 9, the area is 25, so the area occupancy ratio is 5/48=0.521.

The average filter intensity per flatness calculator 1202 performs, for each flatness, an averaging processing on the filter intensities calculated for the individual blocks. In the example shown in FIG. 9A, an area having a flatness of 8 is 5 when the area of one block is 1. In the example shown in FIG. 11, the average filter intensity for a flatness of 8 is {(+5)+(+5)+(+3)+(+3)+(+5)}/5=4.2. The average filter intensity per flatness calculator 1202 calculates the average filter intensity for all the flatnesses. In the example shown in FIG. 9A, blocks having flatnesses of 0 to 9 exist, so a total of 10 average filter intensities are calculated for these flatnesses.

The weighted adder 1203 multiplies the average filter intensity calculated for each flatness by the average filter intensity per flatness calculator 1202 by the area occupancy ratio calculated for each flatness by the area occupancy ratio per flatness calculator 1201. This processing is performed for all the flatnesses, and the multiplication results are added up. Consequently, the average filter intensities of the individual flatnesses are weighted and added in accordance with the area occupancy ratios, and one filter intensity is calculated. In the example shown in FIG. 9A, the weighted addition average filter intensity is 3, and this filter intensity is regarded as the filter intensity of all the blocks as shown in FIG. 13A.

Note that weighted addition averaging is performed for the whole image (one frame) in the example shown in FIG. 13A, but weighted addition averaging may also be performed in a predetermined partial region of an image. For example, weighted addition averaging may be performed for each block, for example, each slice. In this case, filter intensities to be applied to the image are, for example, as shown in FIG. 13B. The spatial smoothing processor 1204 performs a spatial smoothing processing on the filter intensity calculated for each block. For example, the smoothed filter intensity can be obtained by dividing the sum of the filter intensities of a block of interest and its peripheral blocks by the number of added blocks. Since a number of known methods are available as the method of the smoothing processing, any of these methods can be used.

FIG. 13C shows examples of the filter intensity when the spatial smoothing processing is performed on the filter intensity of each block shown in FIG. 11. Comparison of FIG. 13C with FIG. 11 shows that the filter intensity difference between adjacent blocks decreases. If the filter intensity difference between adjacent blocks is large, the degree of block noise reduction changes from one block to another, so a block in which block noise is reduced and a block in which block noise is not reduced may become adjacent to each other. When an observer watches an image processed by using the filter like this, the image looks unnatural to the observer's eyes. Especially when a region in which block noise is reduced and a region in which block noise is not reduced coexist in the same object, the object looks very unnatural. The spatial smoothing processor 1204 performs the spatial smoothing processing in order to solve this problem, thereby decreasing the filter intensity difference between adjacent blocks.

The switch 1205 selects one of the filter intensity having undergone weighted addition in accordance with the area occupancy ratio as shown in FIG. 13A or 13B, and the filter intensity having undergone the spatial smoothing processing as shown in FIG. 13C. The switch 1205 selects a method in accordance with a unit by which the filter intensity can be changed. For example, when the filter intensity can be set for each block, the switch 1205 selects the filter intensity having undergone the spatial smoothing processing, that is, the method shown in FIG. 13C. On the other hand, when the filter intensity can be set for every plurality of blocks (for example, a slice or frame), the switch 1205 selects the filter intensity having undergone weighted addition, that is, the method shown in FIG. 13A or 13B. For example, when the filter intensity is set for each slice, the same filter intensity is set for blocks belonging to the same slice as shown in FIG. 13B. When the same filter intensity is set for the whole image (frame), the result is as shown in FIG. 13A.

Note that in the H.264 standards, for example, the filter intensity can be changed for each slice. To more adaptively change the filter intensity, a plurality of slices must be set in one frame. If a plurality of slices are set, however, various encoding limitations occur in the standards, and the encoding efficiency may decrease. In the H.264 standards, therefore, an encoding method that does not set many slices in one frame is general. For example, when one slice is set in one frame, one filter intensity can be set for one whole frame.

In this case, filter processing can be performed on one whole frame with one filter intensity by selecting the filter intensity having undergone weighted addition as shown in FIG. 13A. Since weighted addition is performed on this filter intensity in accordance with the area occupancy ratio, this filter intensity is calculated by weighting the filter intensity of a region having a large area, that is, a region highly likely to be focused on when the image is watched. Consequently, even when one filter intensity is used for one whole frame, the possibility that block noise in a region highly likely to be focused on is reduced is high. Note that the application range of the present invention is not limited to the H.264 standards, that is, the present invention is applicable to a case in which a plurality of slices are set in one frame (FIG. 13B), or a case in which the filter intensity can be changed for each block (FIG. 13C).

Then, the temporal smoothing processor 1206 performs a temporal smoothing processing so that the filter intensity does not abruptly change between temporally different frames. If the filter intensity abruptly changes between temporally different frames, the degree of reduction of block noise changes from one frame to another, and there is the possibility that a frame in which block noise is temporally reduced and a frame in which block noise is not temporally reduced are generated. When an image like this is watched, therefore, block noise is temporally perceived or not, so the image looks unnatural. To solve this problem, the temporal smoothing processor 1206 performs a smoothing processing on the filter intensities of blocks in the same position of a plurality of frames as shown in FIG. 14. In the example shown in FIG. 14, the smoothing processing is performed by calculating the average value of the filter intensities of blocks in corresponding positions of two adjacent frames. However, the number of frames as targets of the smoothing processing is not limited to this. For example, the smoothing processing can also be performed in a period of 15 or 30 frames. By increasing the number of frames as targets of the smoothing processing, the temporal filter intensity change can be made more moderate.

Also, the magnitude of block noise sometimes changes in accordance with a picture type. For example, block noise generated in an I picture is small, whereas block noise generated in a B picture is large. If the temporal filter intensity smoothing processing is performed for different picture types in a case like this, there is the possibility that the calculated filter intensity is too high for an I picture and too low for a B picture. When performing the temporal smoothing processing, therefore, it is also possible to perform the smoothing processing on the filter intensities of a plurality of frames for each picture type.

Note that the example in which the filter intensity correction unit 122 corrects the filter intensity has been explained in the second embodiment, but the filter intensity correction unit 122 need not correct the filter intensity. For example, the deblocking filter 112 may also perform the filter processing by using the filter intensity (FIG. 11) calculated by the filter intensity calculator 118.

Figure 15:
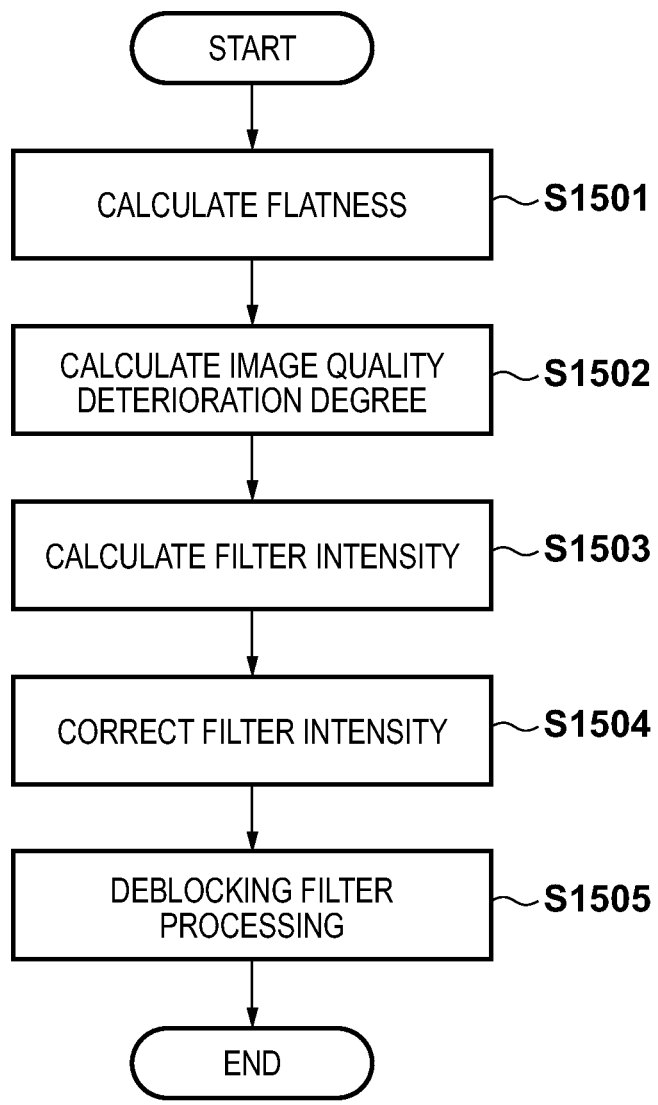
FIG. 15 is a flowchart corresponding to an example of the filter intensity calculation processing in the second embodiment.

A process of calculating the filter intensity of the deblocking filter processing in the second embodiment will be explained below with reference to FIG. 15. This processing is implemented by executing a corresponding program in each block. Alternatively, the processing can be implemented by a CPU operating as each block by executing a corresponding program (stored in a ROM or the like).

In step S1501, the flatness calculator 802 calculates the flatness for each block of an original image or locally decoded image. In step S1502, the image quality deterioration degree calculator 117 calculates the image quality deterioration degree for each block of the original image and locally decoded image. In step S1503, the filter intensity calculator 118 calculates the filter intensity for each block based on the values of the flatness and image quality deterioration degree. In step S1504, the filter intensity correction unit 122 calculates the corrected filter intensity for each block in accordance with the flatness and filter intensity. In step S1505, the deblocking filter 112 performs the deblocking filter processing based on the corrected filter intensity.

In the embodiment of the present invention as explained above, the filter intensity is calculated in accordance with the image quality deterioration degree and flatness. This makes it possible to perform filter intensity control by taking account of image quality deterioration caused by encoding and the visual characteristics of a pattern. This effectively improves the image quality of a decoded image. Also, when performing motion compensation by referring to an image having undergone the deblocking filter processing, the motion prediction accuracy increases because block noise is sufficiently reduced. This effectively increases the encoding efficiency.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-259512, filed Nov. 28, 2011 and 2012-153021, filed Jul. 6, 2012, which are hereby incorporated by reference herein in their entirety.

The invention claimed is:

1. A moving image encoding apparatus for performing encoding using inter prediction between frames, comprising:
   a processor; and
   a memory storing a program which, when executed by the processor, causes the apparatus to:
   generate a predicted image for prediction encoding processing;
   divide an original image into blocks each having a predetermined number of pixels, and perform orthogonal transformation and quantization on a difference between an encoding target image and the predicted image for each of the blocks;
   generate an encoded stream by encoding the transformation result;
   generate a locally decoded image by performing inverse quantization and inverse orthogonal transformation on the transformation result;
   calculate a PSNR (Peak Signal-to-Noise Ratio) from the original image and the locally decoded image;
   calculate a first filter intensity based on the calculated PSNR;
   correct the first filter intensity based on a conspicuity value of block noise, wherein the conspicuity value is determined by comparing a boundary difference value between adjacent boundary pixels and a peripheral difference value between adjacent pixels other than the boundary pixels of the locally decoded image and another locally decoded image adjacent to the locally decoded image, and a second filter intensity estimated based on encoding information obtained from a result of the prediction encoding processing and pattern information of the adjacent boundary pixels; and
   perform a deblocking filter processing on the locally decoded image using the corrected filter intensity.

2. The apparatus according to claim 1, wherein the first filter intensity is corrected if the conspicuity value of block noise is high and the second filter intensity is different from the first filter intensity.

3. The apparatus according to claim 2, wherein the first filter intensity is not corrected, if the conspicuity value of block noise is low, and the second filter intensity is lower than the first filter intensity.

4. The apparatus according to claim 2, wherein the first filter intensity is not corrected, if the conspicuity value of block noise is low, and the second filter intensity is larger than the first filter intensity.

5. The apparatus according to claim 1, wherein the deblocking filter processing for the locally decoded image is invalidated, if the first filter intensity is lower than a threshold value.

6. The apparatus according to claim 1, wherein the boundary difference value between the adjacent boundary pixels is an average value of values for each frame, each slice, or each block to be encoded by the moving image encoding apparatus.

7. The apparatus according to claim 1, wherein the boundary difference value between the adjacent boundary pixels is an average value of values for each frame having the same picture type, among frames to be encoded by the moving image encoding apparatus.

8. A moving image encoding apparatus for performing encoding using inter prediction between frames, comprising:
a processor; and
a memory storing a program which, when executed by the processor, causes the apparatus to:
generate a predicted image for the inter prediction for prediction encoding processing;
divide an original image into blocks each having a predetermined number of pixels for performing orthogonal transformation and quantization on a difference between an encoding target image and the predicted image for each of the blocks;
generate an encoded stream by encoding the transformation result;
generate a locally decoded image by performing inverse quantization and inverse orthogonal transformation on the transformation result;
calculate a PSNR (Peak Signal-to-Noise Ratio) from the original image and the locally decoded image for each block;
calculate a degree of flatness based on a variance of the original image or the locally decoded image for each block, wherein the variance is an index indicating dispersion of pixel values for each block;
determine a filter intensity corresponding to the PSNR and the degree of flatness for each block; and
perform deblocking filter processing on the locally decoded image by using the filter intensity to provide the locally decoded image having undergone the deblocking filter processing for generating the predicted image,
wherein the filter intensity is calculated based on the PSNR and the degree of flatness, such that the filter intensity increases as the PSNR and the degree of flatness increase.

9. The apparatus according to claim 8, wherein
the calculated filter intensity is corrected by performing weighted addition averaging on the filter intensities calculated for individual blocks having the same flatness in a predetermined region of the image, in accordance with a ratio of the blocks in the predetermined region, thereby calculating a weighted addition average filter intensity in the predetermined region, and
the filter intensity of each block contained in the predetermined region is determined as the weighted addition average filter intensity.

10. The apparatus according to claim 9, wherein the predetermined region is a whole of the image, or a part of the image, which includes the plurality of blocks.

11. The apparatus according to claim 8, wherein
the determine a filter intensity comprises performing a spatial smoothing processing on the filter intensity calculated for each block, based on a filter intensity of an adjacent block, and
the filter intensity having undergone the spatial smoothing processing is determined as the filter intensity of the deblocking filter processing.

12. The apparatus according to claim 9, wherein
the determine a filter intensity comprises performing a temporal smoothing processing on a filter intensity calculated for an image encoded before said image, and
the filter intensity having undergone the temporal smoothing processing is determined as the filter intensity of the deblocking filter processing.

13. A control method of a moving image encoding apparatus for performing encoding using inter prediction between frames, comprising:
generating a predicted image for the prediction encoding processing;
dividing an original image into blocks each having a predetermined number of pixels, and performing orthogonal transformation and quantization on a difference between an encoding target image and the predicted image for each of the blocks;
generating an encoded stream by encoding a transformation result in the transforming step;
generating a locally decoded image by performing inverse quantization and inverse orthogonal transformation on the transformation result;
calculating a PSNR (Peak Signal-to-Noise Ratio) from the original image and the locally decoded image; and
calculating a first filter intensity based on the calculated PSNR;
correcting the first filter intensity based on a conspicuity value of block noise, wherein the conspicuity value is determined by comparing a boundary difference value between adjacent boundary pixels and a peripheral difference value between adjacent pixels other than the boundary pixels of the locally decoded image and another locally decoded image adjacent to the locally decoded image, and a second filter intensity estimated based on encoding information obtained from a result of the prediction encoding processing and pattern information of the adjacent boundary pixels; and
performing a deblocking filter processing on the locally decoded image using the corrected filter intensity.

14. A control method of a moving image encoding apparatus for performing encoding using inter prediction between frames, comprising:
generating a predicted image for the inter prediction for prediction encoding processing;
dividing an original image into blocks each having a predetermined number of pixels, for performing orthogonal transformation and quantization on a difference between an encoding target image and the predicted image for each of the blocks;
generating an encoded stream by encoding the transformation result;
generating a locally decoded image by performing inverse quantization and inverse orthogonal transformation on the transformation result;
calculating a PSNR (Peak Signal-to-Noise Ratio) from the original image and the locally decoded image for each block;
calculating a degree of flatness based on a variance of the original image or the locally decoded image for each block, wherein the variance is an index indicating dispersion of pixel values for each block;
determining a filter intensity corresponding to the PSNR and the degree of flatness for each block; and
performing deblocking filter processing on the locally decoded image by using the filter intensity to provide the locally decoded image having undergone the deblocking filter processing for generating the predicted image, wherein the filter intensity is calculated based on the PSNR and the degree of flatness such that the filter intensity increases as the PSNR and the degree of flatness increase.

15. A non-transitory computer-readable storage medium storing a program that, when executed by a processor, cause the processor to perform operations comprising:
generating a predicted image for prediction encoding processing;
dividing an original image into blocks each having a predetermined number of pixels, and of performing orthogonal transformation and quantization on a difference between an encoding target image and the predicted image for each of the blocks;
generating an encoded stream by encoding a transformation result;
generating a locally decoded image by performing inverse quantization and inverse orthogonal transformation on the transformation result in the transforming step;
calculating a PSNR (Peak Signal-to-Noise Ratio) from the original image and the locally decoded image; and
calculating a first filter intensity based on the calculated PSNR,
correcting the first filter intensity based on a conspicuity value of block noise, wherein the conspicuity value is determined by comparing a boundary difference value between adjacent boundary pixels and a peripheral difference value between adjacent pixels other than the boundary pixels of the locally decoded image and another locally decoded image adjacent to the locally decoded image, and a second filter intensity estimated based on encoding information obtained from a result of the prediction encoding processing and pattern information of adjacent boundary pixels; and
performing a deblocking filter processing on the locally decoded image using the corrected fitter intensity.

16. A non-transitory computer readable storage medium storing a program that, when executed by a processor, cause the processor to perform operations comprising:
generating a predicted image for inter prediction for prediction encoding processing;
dividing an original image into blocks each having a predetermined number of pixels, for performing orthogonal transformation and quantization on a difference between an encoding target image and the predicted image for each of the blocks;
generating an encoded stream by encoding the transformation result;
generating a locally decoded image by performing inverse quantization and inverse orthogonal transformation on the transformation result;
calculating a PSNR (Peak Signal-to-Noise Ratio) from the original image and the locally decoded image for each block;
calculating a degree of flatness based on a variance of the original image or the locally decoded image for each block, wherein the variance is an index indicating dispersion of pixel values for each block;
determining a filter intensity corresponding to the PSNR and the degree of flatness for each block; and
performing deblocking filter processing on the locally decoded image by using the filter intensity to provide the locally decoded image having undergone the deblocking filter processing for generating the predicted image,
wherein the filter intensity is calculated based on the PSNR and the degree of flatness such that the filter intensity increases as the PSNR and the degree of flatness increase.

\* \* \* \* \*